US011148805B2

(12) United States Patent
Cooper et al.

(10) Patent No.: US 11,148,805 B2
(45) Date of Patent: Oct. 19, 2021

(54) ENCLOSURE FOR AN UNMANNED AERIAL SYSTEM

(71) Applicant: GOVERNMENT OF THE UNITED STATES, AS REPRESENTED BY THE SECRETARY OF THE ARMY, Washington, DC (US)

(72) Inventors: Neil E. Cooper, Sterling Heights, MI (US); Eric S. Paternoster, Saint Clair Shores, MI (US); Jason A. Schrader, Washington, MI (US); Gary L. Bronstetter, Macomb, MI (US)

(73) Assignee: Government of the United States, as represented by the Secretary of the Army, Washington, DC (US)

( * ) Notice: Subject to any disclaimer, the term of this patent is extended or adjusted under 35 U.S.C. 154(b) by 379 days.

(21) Appl. No.: 16/378,812

(22) Filed: Apr. 9, 2019

(65) Prior Publication Data

US 2019/0308724 A1    Oct. 10, 2019

Related U.S. Application Data

(60) Provisional application No. 62/655,679, filed on Apr. 10, 2018.

(51) Int. Cl.
    *B64C 39/02*    (2006.01)
(52) U.S. Cl.
    CPC ...... *B64C 39/024* (2013.01); *B64C 2201/042* (2013.01); *B64C 2201/141* (2013.01); *B64C 2201/201* (2013.01)
(58) Field of Classification Search
    CPC ........ B64C 2201/042; B64C 2201/088; B64C 2201/141; B64C 2201/201; B64C 29/02;
    (Continued)

(56) References Cited

U.S. PATENT DOCUMENTS

| 7,030,579 B1 * | 4/2006 | Schmitz | F41A 23/24 318/139 |
| 8,439,301 B1 * | 5/2013 | Lussier | B64C 39/024 244/63 |

(Continued)

FOREIGN PATENT DOCUMENTS

| KR | 20170138663 A | 12/2017 |
| WO | 2017029611 A1 | 2/2017 |

(Continued)

OTHER PUBLICATIONS

Mullens, Katherine et al.; "Automated Launch, Recovery, and Refueling for Small Unmanned Aerial Vehicles"; Space and Naval Warfare Systems Center, San Diego, CA, USA; 2006; 12 pages.

(Continued)

*Primary Examiner* — Medhat Badawi
(74) *Attorney, Agent, or Firm* — Gregory P. Gibson

(57) ABSTRACT

An enclosure for a UAS includes a housing having a base and a plurality of sidewalls coupled to the base, a motive apparatus coupled to the housing, a platform coupled to the motive apparatus, and a plurality of lids pivotably coupled to the sidewalls and the platform. The platform and the plurality of lids move collectively under control of the motive apparatus (e.g., a linear actuator). Driving the motive apparatus in a first direction causes the platform to raise from a stowed position toward a deployed position and causes each of the plurality of lids to pivot from a closed position toward an open position. Conversely, driving the motive apparatus in a second direction opposite the first direction causes the platform to lower from the deployed position toward the stowed position and causes each of the plurality of lids to pivot from the open position toward the closed position.

12 Claims, 15 Drawing Sheets

(58) Field of Classification Search
CPC .......... B64C 39/024; B64F 1/005; B64F 1/04; B64F 1/10; B64F 1/00
See application file for complete search history.

(56) References Cited

U.S. PATENT DOCUMENTS

| | | | | |
|---|---|---|---|---|
| 8,511,606 | B1* | 8/2013 | Lutke | B64C 39/028 244/58 |
| 8,521,339 | B2* | 8/2013 | Gariepy | G05D 1/0094 701/2 |
| 9,387,928 | B1* | 7/2016 | Gentry | G08G 5/0052 |
| 9,429,945 | B2* | 8/2016 | Pulleti | G05D 1/0088 |
| 9,527,605 | B1* | 12/2016 | Gentry | G05D 1/0094 |
| 9,561,871 | B2* | 2/2017 | Sugumaran | B64F 1/005 |
| 9,718,564 | B1* | 8/2017 | Beckman | B64C 39/024 |
| 9,841,761 | B2* | 12/2017 | Shehata | G08G 5/0069 |
| 9,928,749 | B2* | 3/2018 | Gil | B64D 1/00 |
| 10,054,943 | B2* | 8/2018 | Sapp, II | G05D 1/0088 |
| 10,336,470 | B2* | 7/2019 | Fisher | B64C 39/024 |
| 10,351,261 | B1* | 7/2019 | Bryant | B64F 1/362 |
| 10,365,663 | B2* | 7/2019 | Ducharme | G05D 1/0866 |
| 10,467,685 | B1* | 11/2019 | Brisson | B64F 1/222 |
| 2005/0006525 | A1* | 1/2005 | Byers | B64C 1/22 244/118.1 |
| 2005/0066806 | A1* | 3/2005 | Helms | F41A 23/20 89/38 |
| 2005/0178879 | A1* | 8/2005 | Mao | B64C 29/02 244/7 B |
| 2005/0231157 | A1* | 10/2005 | Sanders, Jr. | B60L 53/14 320/109 |
| 2006/0249622 | A1* | 11/2006 | Steele | B64F 1/02 244/115 |
| 2009/0236470 | A1* | 9/2009 | Goossen | B64C 39/024 244/115 |
| 2009/0294573 | A1* | 12/2009 | Wilson | B64D 5/00 244/2 |
| 2011/0315810 | A1* | 12/2011 | Petrov | G05D 1/0866 244/17.23 |
| 2012/0080556 | A1* | 4/2012 | Root, Jr. | B64F 1/06 244/63 |
| 2014/0042042 | A1* | 2/2014 | DeVaul | B64F 1/04 206/216 |
| 2015/0158598 | A1* | 6/2015 | You | B64F 1/18 701/16 |
| 2015/0321758 | A1* | 11/2015 | Sarna, II | B64C 39/024 244/63 |
| 2015/0336669 | A1* | 11/2015 | Kantor | G08G 5/0013 701/3 |
| 2016/0009413 | A1* | 1/2016 | Lee | B64F 1/007 701/16 |
| 2016/0011592 | A1* | 1/2016 | Zhang | G05D 1/102 701/2 |
| 2016/0039542 | A1* | 2/2016 | Wang | B64F 1/20 701/2 |
| 2016/0068265 | A1* | 3/2016 | Hoareau | G06Q 10/083 701/3 |
| 2016/0137311 | A1* | 5/2016 | Peverill | G05D 1/101 244/110 C |
| 2016/0144734 | A1* | 5/2016 | Wang | B60L 53/36 701/17 |
| 2016/0196756 | A1* | 7/2016 | Prakash | G08G 5/025 701/3 |
| 2016/0200438 | A1* | 7/2016 | Bokeno | B60L 53/53 244/2 |
| 2016/0229299 | A1* | 8/2016 | Streett | G05D 1/0011 |
| 2016/0253808 | A1* | 9/2016 | Metzler | G01C 15/00 382/103 |
| 2016/0257401 | A1* | 9/2016 | Buchmueller | G06Q 10/083 |
| 2016/0364989 | A1* | 12/2016 | Speasl | G08G 5/0082 |
| 2017/0021941 | A1 | 1/2017 | Fisher et al. | |
| 2017/0021942 | A1* | 1/2017 | Fisher | B64F 1/005 |
| 2017/0023949 | A1* | 1/2017 | Fisher | B64C 29/02 |
| 2017/0101017 | A1* | 4/2017 | Streett | B60L 53/12 |
| 2017/0129464 | A1* | 5/2017 | Wang | B60L 53/80 |
| 2017/0144776 | A1* | 5/2017 | Fisher | B64F 1/005 |
| 2017/0158353 | A1* | 6/2017 | Schmick | B60L 53/12 |
| 2017/0190260 | A1* | 7/2017 | Wang | B60L 53/67 |
| 2017/0190443 | A1* | 7/2017 | Fisher | B64C 29/02 |
| 2017/0203857 | A1* | 7/2017 | O'Toole | A47G 29/141 |
| 2017/0225799 | A1* | 8/2017 | Selwyn | D06M 14/00 |
| 2017/0225802 | A1* | 8/2017 | Lussier | E04H 12/003 |
| 2018/0024571 | A1* | 1/2018 | Peasgood | B64C 39/02 244/7 C |
| 2019/0014760 | A1* | 1/2019 | Twining | A01M 31/002 |
| 2019/0023416 | A1* | 1/2019 | Borko | B64C 39/024 |
| 2019/0308724 | A1* | 10/2019 | Cooper | B64F 1/222 |

FOREIGN PATENT DOCUMENTS

| | | |
|---|---|---|
| WO | 2018236903 A1 | 12/2018 |
| WO | 2019151947 A1 | 8/2019 |
| WO | 2019226917 A1 | 11/2019 |
| WO | 2020060488 A1 | 3/2020 |

OTHER PUBLICATIONS

Acuna, Raul et al.; "Dynamic Markers: UAV landing proof of concept." arXiv:1709.04981v1; Sep. 14, 2017; 8 pages.

Lillian, Betsy; "Jaguar Land Rover Teams with Red Cross for Drone Equipped SUV"; Unmanned Aerial Online; Retrieved from https://unmanned-aerial.com/jaguar-land-rover-teams-red-cross-drone-equipped-suv; Mar. 10, 2017; 3 pages.

"The Internet of Drones has landed: H3 Dynamics Unveils Dronebox"; Business Wire; Feb. 16, 2016; Berkshire Hathaway Company; available at https://www.businesswire.com/news/home/20160216005739/en/Internet-Drones-Landed-H3-Dynamics-Unveils-DRONEBOX; 3 pages.

Kharpal, A.; "This firm beat Amazon to drone deliveries by launching it from the roof of a truck."; Aug. 18, 2016; Retrieved from https://www.cnbc.com/2016/08/18/this-firm-beat-amazon-to-drone-deliveries-by-launching-it-from-the-roof-of-a-truck.html; 3 pages.

Sofge, E.; "The Dream of Delivery Drones Is Alive (And On A Truck)"; Retrieved from http://www.popsci.com/dream-delivery-drones-alive-and-truck/; Feb. 18, 2015; 3 pages.

Author unknown; "UPS Tests Truck-Launched Drone Delivery With Workhorse"; Aviation Week Network; Feb. 24, 2017; 3 pages.

* cited by examiner

ENCLOSURE FOR AN UNMANNED AERIAL SYSTEM

CROSS-REFERECE TO RELATED APPLICATIONS

This application claims the benefit of U.S. Provisional Patent Application Ser. No. 62/655,679, filed on Apr. 10, 2018, by at least one common inventor, which is incorporated by reference herein in its entirety.

GOVERNMENT INTEREST

The inventions described herein may be made, used, or licensed by or for the U.S. Government for U.S. Government purposes without payment of royalties to me/us.

BACKGROUND OF THE INVENTION

Field of the Invention

The present invention relates generally to enclosures and, more particularly, to an enclosure for an unmanned aerial system (UAS). Even more particularly, the invention relates to an enclosure configured to carry a UAS on a ground vehicle.

Description of the Background Art

Unmanned aerial systems (UAS) include autonomous, semi-autonomous, and/or remote controlled devices configured for flight. UAS are available in a variety of form factors, including camera drones, aerial vehicles adapted to carry payloads, etc. UAS are used for a variety of purposes, including surveillance, package delivery, etc.

Military ground vehicles face a variety of threats when operating in theater and, therefore, could benefit from one or more UAS's carried thereon. Because military ground vehicles are relatively slow, especially when operating off-road, enemies will attempt to spring traps and/or attack them by surprise. Accordingly, improving the surveillance capabilities of military ground vehicles by UAS is desirable. Furthermore, while many ground vehicles have armor plating to protect the occupants inside, only so much armor can be added to a vehicle before the vehicle becomes so heavy that it can no longer perform its mission effectively. Therefore, while armor provides passive protection, a UAS provides increased situational awareness that contributes to the survivability of the vehicle without significantly increasing its weight. Unfortunately, it is difficult to carry a UAS on a military ground vehicle, because such vehicles face harsh operating conditions such as high ambient temperatures, direct extended sun, sand, high winds, increased vibration, etc. which can damage and/or degrade vehicle systems.

When a UAS is not in use, it is sometimes desirable to store the UAS in another structure. Such structures have been proposed in the prior art, but unfortunately, are not sufficiently rugged for military use. Additionally, such prior art structures suffer disadvantages such as having large footprints and/or form factors, complex operating mechanisms, etc.

SUMMARY OF THE INVENTION

The present invention overcomes the problems associated with the prior art by providing a rugged enclosure for deploying and stowing an unmanned aerial system (UAS). The invention provides an automated enclosure with a small footprint that is well-suited for mounting on a ground vehicles, such as those used in the military.

An enclosure for a UAS according to an exemplary embodiment of the invention includes a housing having a base and a plurality of sidewalls coupled to the base, a motive apparatus coupled to the housing, a platform coupled to the motive apparatus, and a plurality of lids where each of the plurality of lids is coupled to one of the plurality of sidewalls and to the platform. The base and the plurality of sidewalls define an interior volume of the housing, and the platform is configured to move generally vertically within the interior volume under control of the motive apparatus. The plurality of lids are also movable between open and closed positions under control of the motive apparatus. Driving the motive apparatus in a first direction causes the platform to move from a stowed position toward a deployed position and causes each of the plurality of lids to move from a closed position toward an open position. Additionally, driving the motive apparatus in a second direction opposite the first direction causes the platform to move from the deployed position toward the stowed position and causes each of the plurality of lids to move from the open position toward the closed position.

In a particular embodiment, the enclosure includes at least one airflow management feature configured to route airflow generated by the UAS. As one example, the airflow management feature includes a plurality of vents formed in the housing. As another example, the airflow management feature includes an opening formed in the platform.

In another particular embodiment, the enclosure further includes a power connector coupled to the platform and protruding generally upward therefrom. The power connector is configured to engage a complementary power connector of the UAS. In a more particular embodiment, the enclosure further includes a plurality of guides coupled to the platform. The guides are configured to passively position the UAS (on landing) such that the complementary power connector of the UAS is moved into alignment with the power connector coupled to the platform.

In still another particular embodiment, the enclosure includes a plurality of guides that are coupled to the platform and extend generally vertically therefrom. Each of the guides is configured to slidably engage a landing support of the UAS and passively guide the landing support of the UAS along each of a plurality of directions into a predetermined position on the platform. In a more particular embodiment, the platform defines an opening therethrough, at least some of said plurality of guides are removably coupled to a top surface of the platform outside of the opening, each of the guides defines an inside apex, and each of the guides is configured to passively guide a respective landing support of the UAS toward a predetermined location on the platform between the inside apex of the guide and the opening.

In yet another particular embodiment, the enclosure further includes at least one retainer coupled to the plurality of lids, where the at least one retainer is configured to urge the UAS toward the platform when the plurality of lids are in the closed position. Optionally, the enclosure can further include retainer(s) on each of the plurality of lids, where each retainers is positioned to contact a respective one of a plurality of propellers of the UAS.

In another particular embodiment, the enclosure further includes at least one bumper coupled to the motive apparatus and positioned under the platform. In a more particular embodiment, the at least one bumper moves with a portion of the motive apparatus.

In still another particular embodiment, the enclosure further includes a plurality of linkages, where each linkage pivotably couples a respective one of the plurality of lids to the platform. In a more particular example, at least one of the linkages comprises a mechanical adjustment feature configured to alter movement of the respective one of the plurality of lids relative to another of the plurality of lids. In a still even more particular example, the linkage having the mechanical adjustment feature includes a first segment affixed to the platform and extending generally upward therefrom to define a first connection point, a second segment affixed to the respective one of the plurality of lids and extending away from the lid to define a second connection point, and a third segment pivotably coupled between the first connection point and the second connection point. The mechanical adjustment feature includes an elongated slot formed in at least one of the segments at one of the first connection point and the second connection point.

In yet another particular embodiment, the enclosure further includes a biasing member coupled between the housing and the motive apparatus. The biasing member is configured to bias the platform toward the deployed position when the platform is in the stowed position.

In still another particular example, the enclosure further includes an enclosure controller adapted to interface with the motive apparatus and to selectively drive the motive apparatus in the first and second directions. In a more particular embodiment, the enclosure includes a vehicle bracket comprising a base, whereby the enclosure can be mounted to a first side of the base, and the enclosure controller can be mounted to the side of the base opposite the enclosure.

An enclosure for a UAS according to another exemplary embodiment includes a housing defining an interior volume, a platform configured to move generally vertically within the interior volume, a plurality of lids pivotably coupled to the housing and to the platform and movable between open and closed positions, and means for simultaneously moving the platform between stowed and deployed positions and each of the plurality of lids between closed and opened positions.

An enclosure for a UAS according still another exemplary embodiment includes a housing defining an interior volume, an actuator mounted within the interior volume, a platform coupled to the actuator and configured to move generally vertically within the interior volume under control of the actuator, first and second non-metallic lids movable between open and closed positions under control of the actuator, a plurality of airflow management vents formed in the housing, a plurality of guides coupled to the platform, a plurality of retainers, and a power connector coupled to the platform and configured to engage a complementary power connector on the UAS. Furthermore, each of the first and the second lids is pivotably coupled between the housing and the platform via a multi-segment linkage. Each of the multi-segment linkages can include three segments and a mechanical adjustment feature as described above. Furthermore, the platform defines an opening therethrough as well as a generally uniform gap around a perimeter of the platform between the platform and the housing, whereby the opening and the gap facilitate the movement of air passed the platform. Additionally, the guides are configured to slidably engage respective landing supports of the UAS and to guide each of the landing supports along a plurality of directions into a predetermined position on the platform between an inside apex of the guide and the opening. The plurality of retainers is mounted on inside surfaces of each of the first and second lids, whereby the retainers are positioned to urge the UAS toward the platform when the lid is in the closed position. Driving the actuator in a first direction raises the platform and opens the first and the second lids, whereas driving the actuator in a second direction opposite the first direction lowers the platform and closes the first and the second lids.

BRIEF DESCRIPTION OF THE DRAWINGS

The present invention is described with respect to the following figures, wherein like reference numbers indicate substantially-similar elements.

DETAILED DESCRIPTION

As required, detailed embodiments of the present invention are disclosed herein; however, it is to be understood that these embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. In other instances, particulars of well-known components and manufacturing practices (e.g., actuator control, metal forming, etc.) have been omitted so as to not unnecessarily obscure the present invention.

Figure 1:
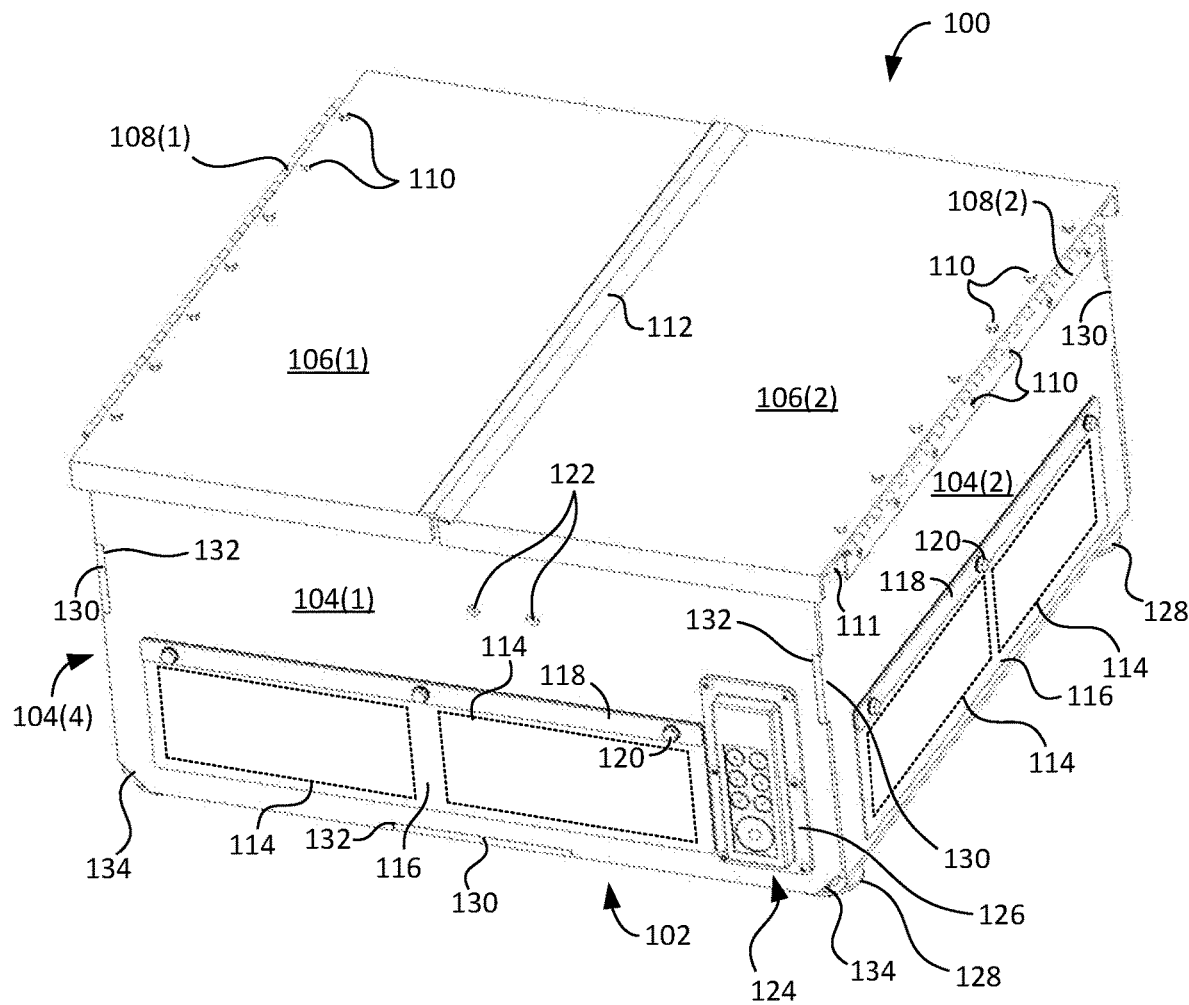
FIG. 1 is a perspective view showing an enclosure according to one embodiment of the present invention.

FIG. 1 is a front perspective view showing an enclosure 100 for housing an unmanned aerial system (UAS), such as a multi-rotor unmanned aerial vehicle (UAV), therein. Enclosure 100 includes a base 102 and a plurality of sidewalls 104(1-4) coupled to base 102. Together, base 102 and sidewalls 104(1-4) define an interior volume (FIG. 3) for housing the UAS therein. A plurality of movable lids 106 (1-2) cover the interior volume defined by base 102 and sidewalls 104(1-4). Each lid 106 is generally rectangular and is rotatably coupled to one of sidewalls 104 via a hinge 108 coupled between an outside long edge of lid 106 and an adjacent sidewall 104. Hinges 108(1-2) are affixed using fasteners 110 (e.g., screws, rivets, etc.) in this example. A spacer 111 is positioned (e.g., welded, glued, sandwiched, etc.) between each of sidewalls 104(2) and 104(4) and its respective hinge 108 near the top edge of the sidewall 104. Optionally, spacer 111 is machined to accept fasteners 110.

FIG. 1 shows enclosure 100 in a stowed state, such that the UAS is stored therein with lids 106(1-2) closed. When UAS is to be launched, both of lids 106(1-2) pivot open about hinges 108(1-2), respectively. Weather-stripping 112 is affixed along the inner long edge of lid 106(1) to cover a gap between lids 106(1-2) when closed. Weather-stripping 112 resists rain and particulate intrusion into enclosure 100 through the gap.

Each sidewall 104(1-4) is further shown to include one or more rotor wash vent(s) 114. In this example, each vent 114 comprises a generally rectangular passage. Additionally, each vent 114 is covered by one or more flap(s) 116 formed from a flexible material (e.g., rubber, etc.). Here, each sidewall 104 has a flap 116 secured thereto via a bracket 118 and fasteners 120 (e.g., screws, rivets, etc.). Vents 114 allow air to escape the interior volume of enclosure 100 by pushing flaps 116 outward when the UAS is taking off or landing. At other times, flaps 116 hang and prevent dust and debris from entering enclosure 100 as shown in FIG. 1.

Front sidewall 104(1) is also shown to include a plurality of apertures 122 and a passage 124 formed therein. (Sidewall 104(3) opposite sidewall 104(1) also defines apertures 122 (FIG. 3).) Apertures 122 facilitate the mounting of other components to the outside of enclosure 100. Passage 124 provides access to the interior of enclosure 100 (e.g., for the passage of cabling, inspection, etc.). Optionally, passage 124 can be sealable and/or can include a passage insert 126. Passage insert 126 can comprise a connector set, a cable sealing device (e.g., a Roxtec Cable Gland), etc.

Enclosure 100 is further configured to be optionally mounted on another structure via a plurality of attachment assemblies 128. Such attachment assemblies can comprise bolt and washer combinations (FIGS. 6A-6B), clamps, etc. Enclosure 100 can, for example, be affixed to a mounting bracket for a vehicle (FIGS. 12A-12B), a stand or pedestal for supporting enclosure 100 on the ground, a mounting bracket on the side of a building, etc. In other examples, enclosure 100 is free standing.

Base 102, sidewalls 104(1-4), and lids 106(1-2) can be formed from any suitable material or combination of suitable materials, such as metal, plastic, a 3-D printable material, resin-impregnated fiber, etc. In the illustrated embodiment, base 102 and sidewalls 104(2) and 104(4) (see also FIG. 6A) are formed from one continuous piece of material (e.g., aluminum, etc.) where sidewalls 104(2) and 104(4) are bent upward from base 102. By contrast, sidewalls 104(1) and 104(3) are formed as separate panels (e.g., also of aluminum, etc.) and are aligned with respect to sidewalls 104(2) and 104(4) via complementary interlocking tabs 130 and slots 132. Thereafter, sidewalls 104(1) and 104(3) can be secured to base 102 and sidewalls 104(2) and 104(4) by, for example, welding, fasteners, etc. Note that sidewalls 104(1) and 104(3) include truncated bottom corners, which define apertures 134 for water drainage. In a particular embodiment, base 102 and sidewalls 104(1-4) are formed (e.g., by waterjet) from aluminum plate having thickness of at least 0.25 inches. In other embodiments, base 102 and sidewalls 104(1-4) can be integrally formed by injection molding, 3D printing, fiber-impregnated composite material, etc.

Figure 2:
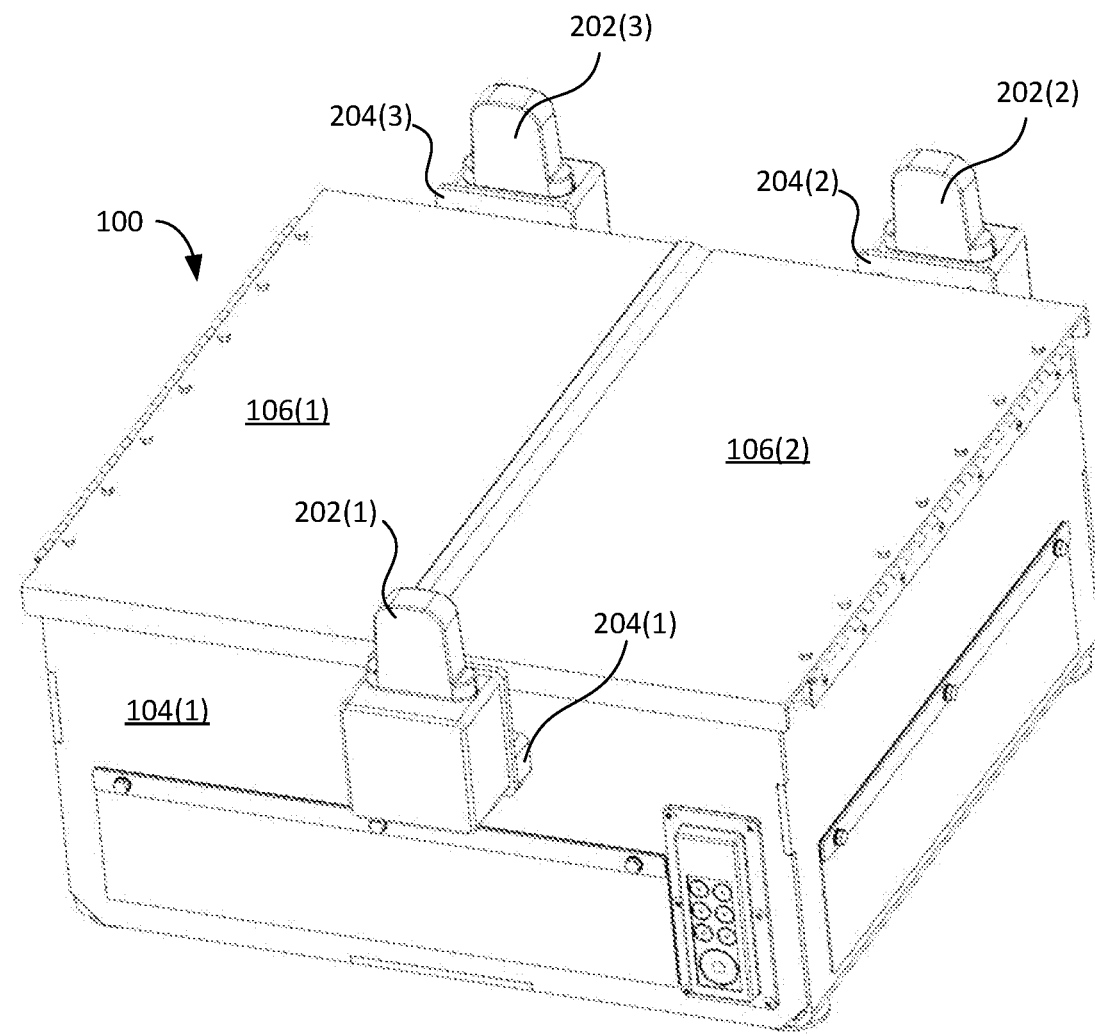
FIG. 2 is a perspective view showing the enclosure of FIG. 1 having components mounted to the outside thereof.

FIG. 2 is another front perspective view showing enclosure 100 in a stowed state and having a plurality of components 202(1-3) mounted thereto. Here, components 202 (1-3) comprise radio-frequency navigational devices (nodes) that are secured to opposite sidewalls 104(1) and 104(3) via fasteners (not shown) inserted through apertures 122 and interposing brackets 204(1-3) from the inside of enclosure 100. Brackets 204(1-3) position their associated components 202(1-3) away from sidewalls 104(1) and 104(3) a sufficient distance that components 202(1-3) do not interfere with the opening and closing of lids 106(1-2). In some embodiments, nodes 202 can be used as navigational aids for the UAS (e.g., defining planes, navigation points, etc.). Navigational nodes can also be mounted on a vehicle or other structure near enclosure 100. In other embodiments, devices other than, or in addition to, navigational nodes 202 can be mounted to the outside of enclosure 100.

Figure 3:
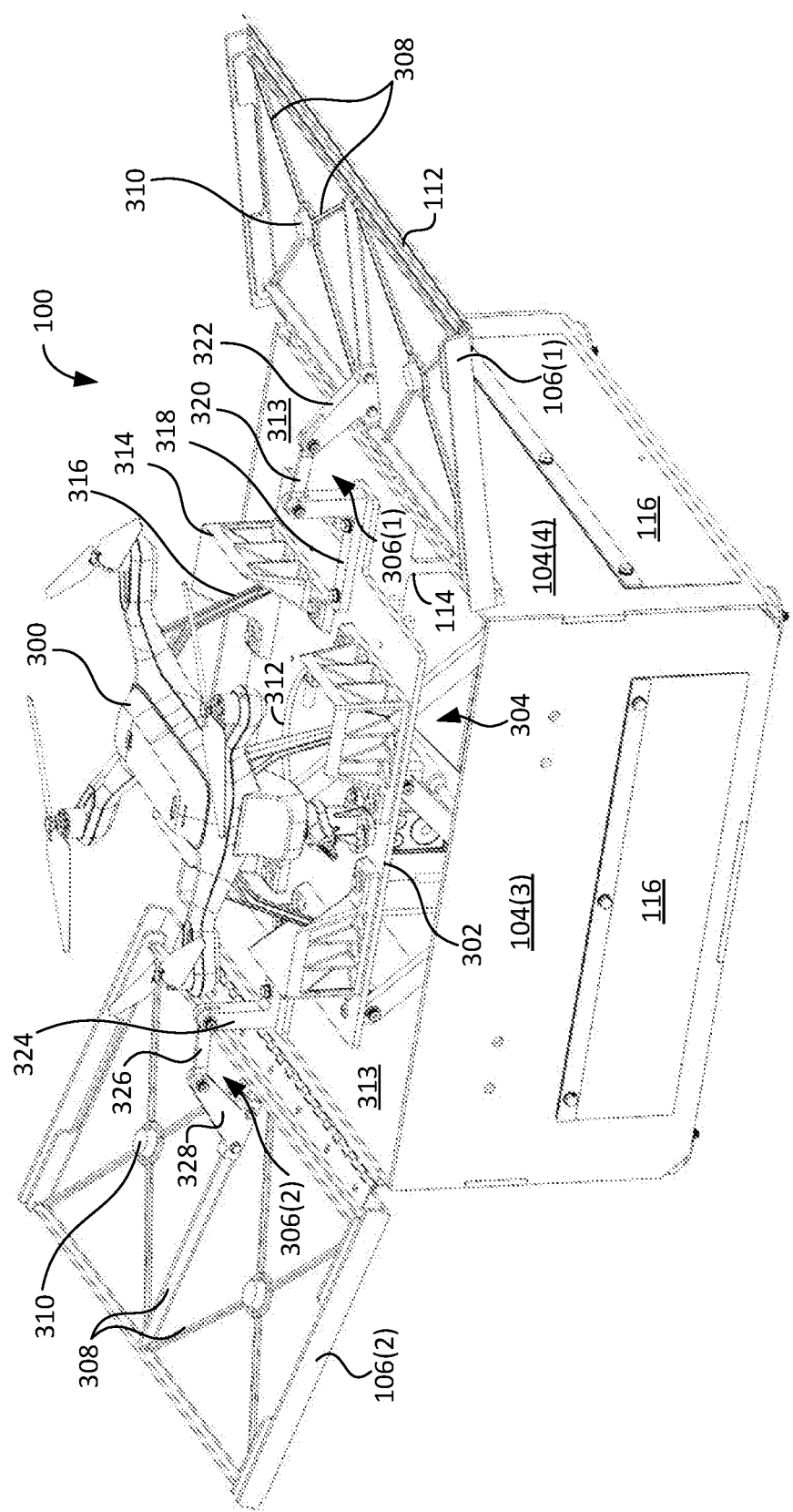
FIG. 3 is a perspective view showing the enclosure of FIG. 1 in a deployed state.

FIG. 3 is a rear perspective view showing enclosure 100 in a deployed state. In the deployed state, lids 106(1-2) are opened and a UAV 300 is raised up and out of the interior volume of enclosure 100. More particularly, enclosure 100 includes a platform 302 that selectively moves vertically under the control of a motive apparatus 304, which will be described in more detail below. Platform 302 is coupled to each of lids 106(1-2) via respective multi-segment movable linkages 306(1-2).

Each lid 106(1-2) includes a ribbed support structure 308 to which a respective one of linkages 306(1-2) is coupled. As platform 302 rises, linkages 306(1-2) push open lids 106(1-2), respectively. Conversely, as platform 302 lowers, linkages 306(1-2) pull their respective lids 106(1-2) closed. Thus, lids 106(1-2) also open and close under the control of motive apparatus 304. Each lid 106(1-2) also further includes a plurality of retainers 310 (e.g., foam rubber pads, etc.) affixed (e.g., glued) thereto, which prevent UAV 300 from vibrating and shifting within enclosure 100 when stowed. In the illustrated embodiment, lids 106(1-2) are formed from a non-metal (e.g., plastic, acrylic such as Plexiglas®, polycarbonate, etc.) to facilitate improved GPS and other radio frequency signal reception while UAV 300 is near enclosure 100 or inside enclosure 100 with lids 106(1-2) closed. Indeed, in a particular example, CNC machining each lid 106 from a plate of solid material provides desirable advantages. For instance, ribbed support structure 308 can be integrally formed with lid 106 for added strength and rigidity, pockets to receive and precisely position retainers 310 can be formed for a particular UAS 300, holes can be machined to receive fasteners 110 for hinges 108, grooves can be formed to receive the top edges of sidewalls 104 and/or to position weather stripping 112, etc.

Platform 302 is a generally flat surface defining an aperture 312 therethrough and having a plurality of guides 314 (four in the present example) coupled to its top surface. Aperture 312 facilitates airflow passed platform 302 during take-off and landing of UAV 300. Additionally, a substantially uniform gap 313 is provided between platform 302 and sidewalls 104(1-4) around the majority of platform 302, which further facilitates the movement of air generated by UAV 300 passed platform 302. Air moving passed platform 302 flows out of enclosure 100 via vents 114 and outward movement of flaps 116. Airflow management provided by aperture 312, gap 313, and vents 114 diverts rotor wash away from UAV 300, which helps stabilize UAV 300 during take-off and landing.

Guides 314 are positioned about platform 302 such that each guide 314 receives and positions a respective leg 316 of UAV 300 with respect to platform 302 for UAV stowage. In this embodiment, each of guides 314 comprises two sides that extend upward from the top surface of platform 302. The sides of each guide 314 are sloped from top to bottom and are wider at their bases, which enables a respective leg 316 of UAV 300 to slide against the inside surfaces of guide 314. Thus, on landing, guides 314 collectively "funnel" UAV 300 into a predetermined position on platform 302 by pushing respective legs 316 of UAV 300 in contact therewith laterally in either of two dimensions. Thus, once UAV 300 is over platform 302, UAV 300 can simply be throttled back so as to descend and be maneuvered by guides 314 into the desired position on platform 302 by guides 314.

Returning now to linkages 306, each linkage 306 comprises three segments. Linkage 306(1) comprises a first segment 318, a second (middle) segment 320, and a third segment 322. First segment 318 is coupled to platform 302, whereas third segment 322 is coupled to lid 106(1). Middle segment 320 is pivotably coupled between first and third segments 318 and 322 near opposite ends thereof via respective fasteners that enable pivoting movement (e.g., shoulder bolts and nuts, rivets, etc.). Similarly, linkage 306(2) comprises a first segment 324, a second (middle) segment 326, and a third segment 328. First segment 324 is coupled to platform 302, third segment 328 is coupled to lid 106(2), and middle segment 326 is pivotably coupled therebetween.

As is apparent from FIG. 3, linkages 306(1) and 306(2) are positioned on opposite sides of enclosure. First segments 318 and 324 are L-shaped and coupled to opposites sides of platform 302. Each segment 318 and 324 extends generally upward from platform 302 toward a first connection point with respective middle segments 320 and 326. Third segments 322 and 328 are affixed (e.g., by fasteners, etc.) to lids 106(1) and 106(2), respectively, and extend inward and away from their respective lids 106(1) and 106(2) toward a second connection point with respective middle segments 320 and 326. Middle segments 320 and 326 are accordingly pivotably coupled between respective first and third segments at respective first and second connection points therewith. While linkages 306(1) and 306(2) are similar, the middle segments 320 and 326 thereof are structurally and functionally different in this particular embodiment. As will be described in more detail below with respect to FIGS. 9A and 9B, middle segment 326 comprises a mechanical adjustment feature configured to both slightly delay the opening of second lid 106(2) relative first lid 106(1) and slightly advance closing of second lid 106(2) relative to first lid 106(1), for example, to prevent binding of lids 106(1-2), so weather stripping 112 overlaps lid 106(2), etc. The lengths of each linkage segment and the particular locations of the connection points with the middle segments and with lids 106(1-2) can be customized to obtain desirable motion of the lids 106(1-2).

Figure 4:
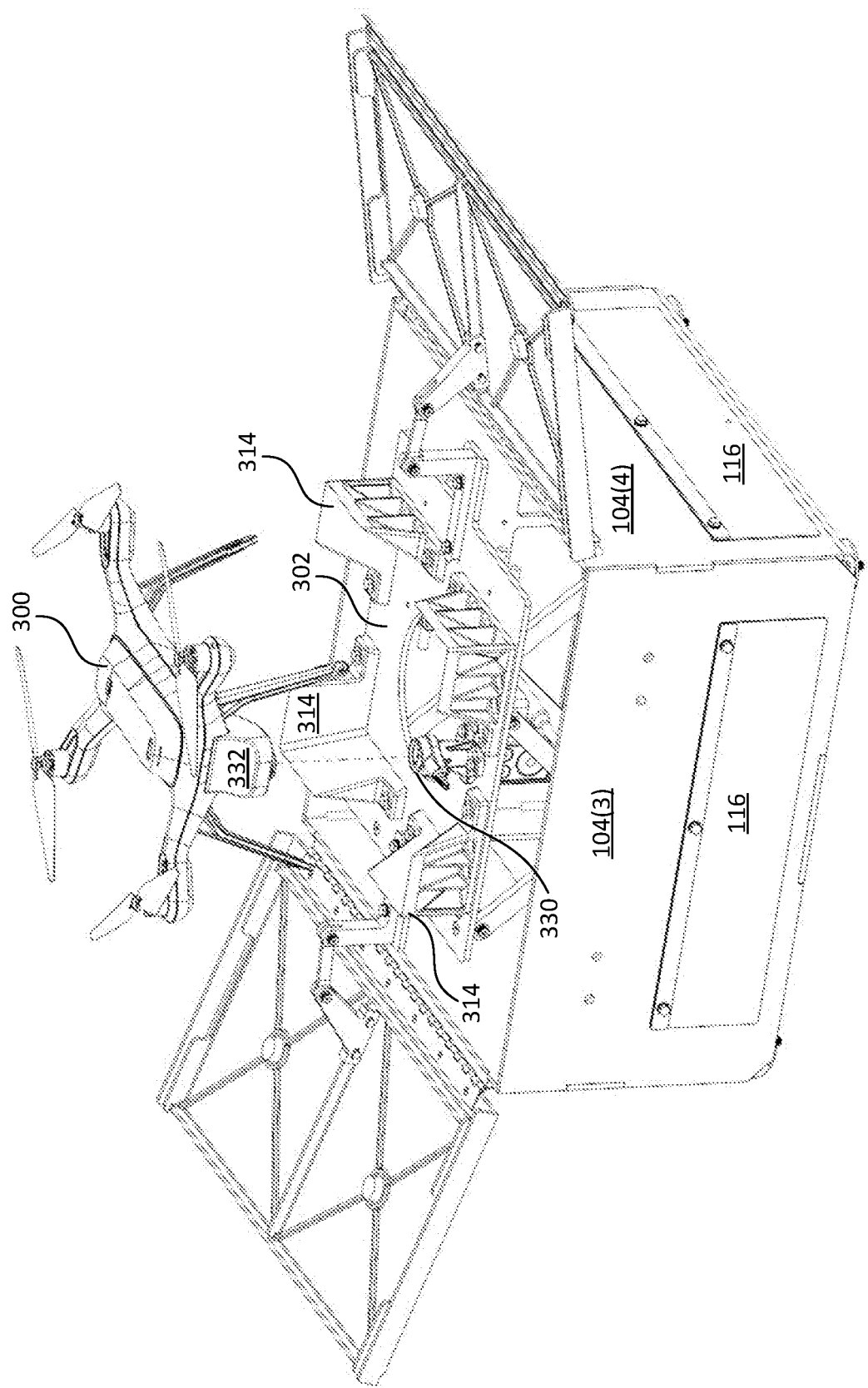
FIG. 4 is another perspective view showing the enclosure of FIG. 1 in a deployed state.

FIG. 4 is another rear perspective view showing enclosure 100 in a deployed state after UAV 300 has lifted off from platform 302. When UAV 300 takes off, a power connector 330 affixed to platform 302 separates from a complementary power connector 332 on UAV 300. Conversely, when UAV 300 lands, power connector 330 and complementary power connector 332 are re-engaged as a result of the passive alignment therebetween provided by guides 314.

Figure 5:
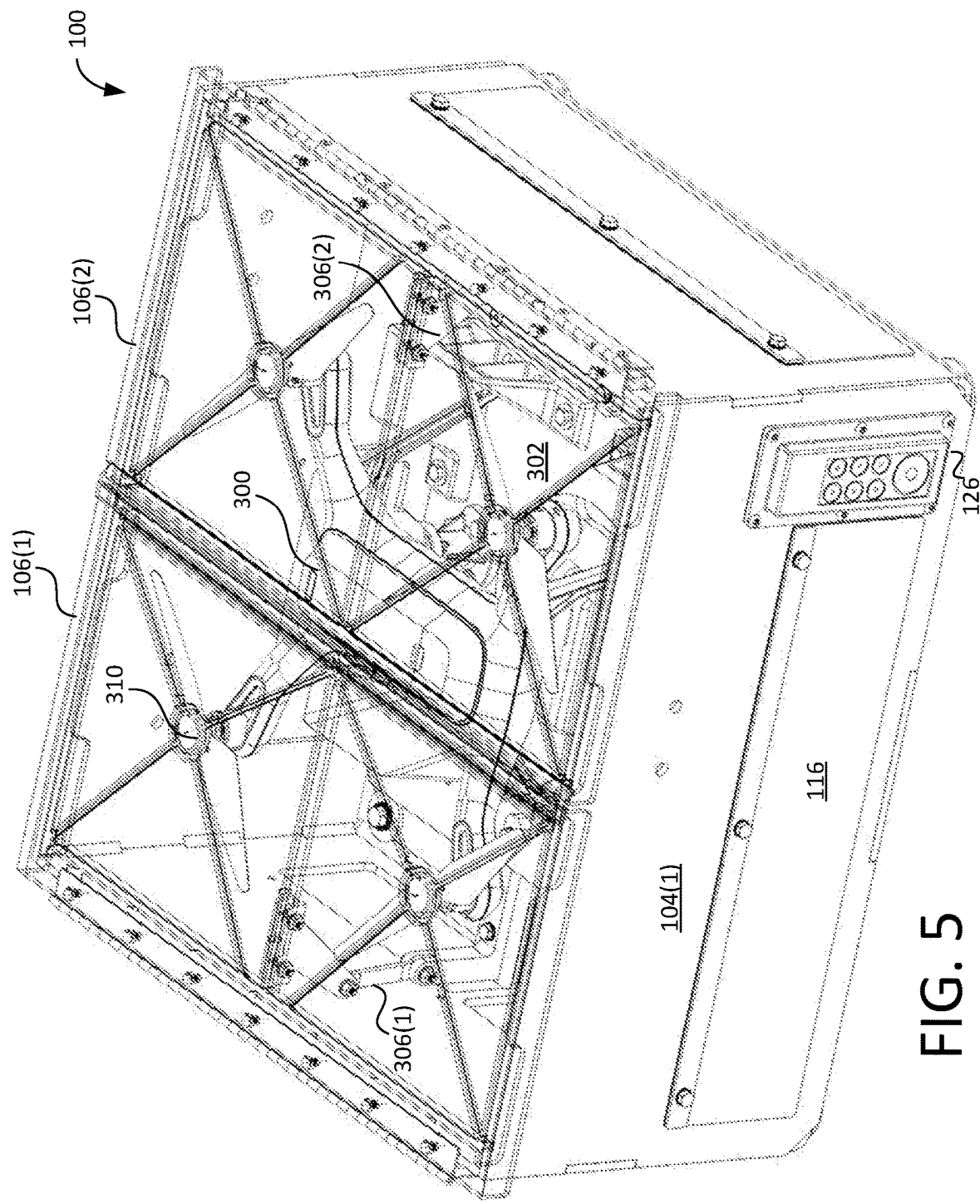
FIG. 5 is a "see through" perspective view showing the enclosure of FIG. 1 in its stowed state with an unmanned aerial system stored therein.

FIG. 5 is a perspective view showing enclosure 100 in its stowed state having UAV 300 lowered therein with lids 106(1-2) closed. In this embodiment, lids 106(1-2) are shown transparent so the interior or enclosure 100 can be viewed from above. Advantageously, UAV 300 is completely contained within and protected by enclosure 100. Additionally, because platform 302 has been lowered, linkages 306(1-2) have pulled lids 106(1-2) closed and secured them in their closed states. Because lids 106(1-2) position retainers 310 in contact with the top of the propellers (or propeller towers) of UAV 300, downward pressure from retainers 310 urges UAV 300 toward platform 302 and prevents it from rattling and shifting thereon.

Figure 6A:
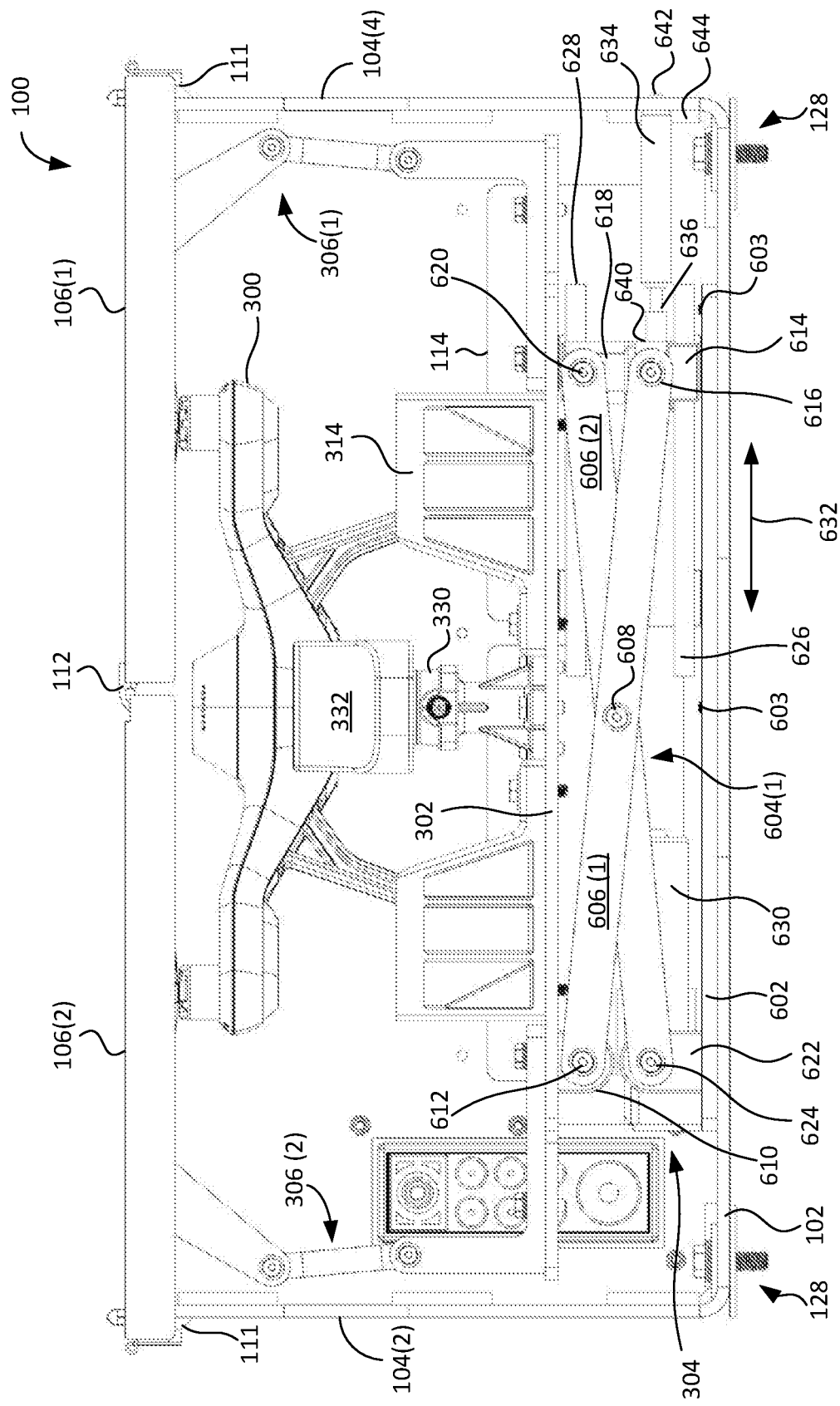
FIG. 6A is a side view of the enclosure of FIG. 1 showing its interior features in greater detail.
Figure 6B:
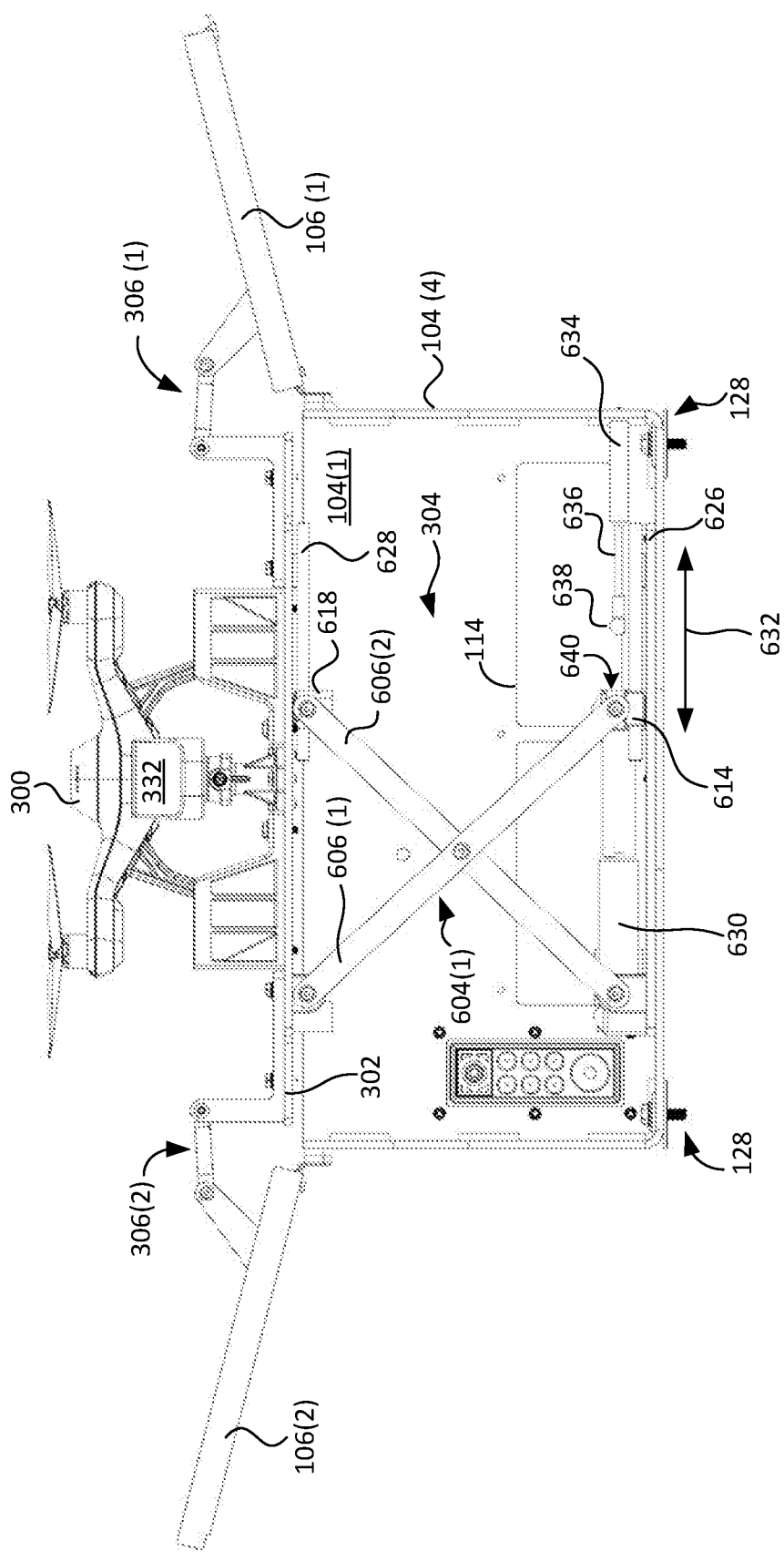
FIG. 6B is another side view of the enclosure of FIG. 1 showing its interior features in greater detail.

FIGS. 6A and 6B are side views of enclosure 100 with sidewall 104(3) removed such that interior features of enclosure 100 can be viewed in greater detail. More particularly, FIG. 6A is a side view showing enclosure 100 in a stowed state with platform 302 lowered and lids 106(1-2) closed over UAV 300. FIG. 6B, by contrast, is a side view showing enclosure 100 in a deployed state with lids 106(1-2) open and platform 302 and UAV 300 raised.

In this example, motive apparatus 304 includes a base 602 and a plurality of scissor mechanisms 604(1-2) coupled between platform 302 and base 602. (Only one scissor mechanism 604(1) is shown in FIG. 6A.) Base 602 of motive apparatus 304 is mounted to the inner surface of base 102 of enclosure 100, for example, by a plurality of threaded fasteners 603. Each scissor mechanism 604 comprises two members 606(1-2) pivotably coupled to one another near their centers via a fastener 608 (e.g., a threaded fastener, rivet, etc.). Optionally, a thrust bearing (not shown) can be inserted between members 606(1-2) for additional ruggedness. For scissor mechanism 604(1), member 606(1) is pivotably coupled to platform 302 near an upper distal end of member 606(1) via a pivot structure 610 and a fastener 612. Member 606(1) is further pivotably coupled to a lower sliding member 614 via a fastener 616. By contrast, member 606(2) of scissor mechanism 604(1) is pivotably coupled to an upper sliding mechanism 618 near an upper distal end of member 606(2) via a fastener 620. Member 606(2) is further pivotably coupled to base 602 via a pivot structure 622 and a fastener 624. Any suitable fasteners (e.g., rivets, shoulder bolts, etc.) that facilitate pivoting can be used for fasteners 608, 612, 616, 620, and 624. Optionally, washers (e.g., formed from Teflon™, etc.) can be used at pivoting connections for smooth operation.

Sliding members 614 and 618 are elongated and oriented generally parallel to sidewalls 104(2) and 104(4) into the plane of the page. Lower and upper sliding members 614 and 618 slide along lower and upper guide pins 626 and 628, respectively, under the control of an actuator 630. Actuator 630 is a linear actuator in this example and extends and retracts to move sliding member 614 laterally in the direction of arrow 632 along guide pins 626. When actuator 630 moves sliding member 614 inward from sidewall 104(4) (e.g., by pulling sliding member 616 along guide pins 626 toward the center of enclosure 100), the bottom distal ends of members 606(1-2) of each scissor mechanisms 604 are moved closer together, which raises platform 302, opens lids 106(1-2) via linkages 306(1-2), and deploys UAV 300. Such action further causes upper sliding member 618 to slide inwardly along upper guide pins 628, which moves the top distal ends of members 606(1-2) of scissor mechanisms 604(1-2) closer together in unison with their bottom distal ends. Conversely, when actuator 630 moves lower sliding member 614 toward sidewall 104(4) (e.g., by pushing lower sliding member 614 outward along guide pins 626), the bottom and top distal ends of members 606(1-2) of each scissor mechanisms 604(1-2) are moved farther apart substantially in unison, which lowers platform 302 and pulls lids 106(1-2) closed via linkages 306(1-2) while stowing UAV 300 within enclosure. Thus, motive apparatus 304 and linkages 306(1-2) comprise means, coupled to platform 302 and to each of lids 106(1-2), for simultaneously moving platform 302 between stowed and deployed positions and lids 106(1-2) between closed and opened positions.

FIG. 6B further shows that motive apparatus 304 is configured to raise platform 302 to a deployed height that is slightly above the top of sidewalls 104(1-4). In the deployed state, lids 106(1-2) are wide open so as not to interfere with operation of UAV 300. Comparing FIG. 6B to FIG. 6A also shows how sliding members 614 and 618 slide on their respective guide pins 626 and 628 when transitioning between deployed and stowed states. Additionally, vents 114 are formed large enough in this embodiment that the interior of enclosure 100 can be accessed from the outside of enclosure 100 by lifting up a flap 116 (FIG. 3; not shown in FIG. 6B). This advantageously facilitates servicing the motive apparatus 304, etc. from outside enclosure 100.

Enclosure 100 also includes a lift-assist mechanism 634 disposed between lower sliding member 614 and sidewall 104(4) of enclosure 100. Lift-assist mechanism 634 comprises a ram 636 coupled to a ball end 638, where ram 636 is axially compressible in the direction of arrow 632 via ball end 638. Ball end 638 is further sized to engages a bore 640 formed in sliding member 614 when sliding member 614 is in the position shown in FIG. 6A. In that position, ball end 638 is compressed toward sidewall 104(4), such that it applies a force to sliding member 614 away from sidewall 104(4) and toward the center of enclosure 100. When actuator 630 attempts to move sliding member 614 inward to raise platform 302, lift-assist mechanism 634 applies an inward force to scissor mechanisms 604(1-2) via sliding member 614 and assists in raising platform 302 when scissor mechanisms 604(1-2) are in their lowered positions, which provide minimal leverage. In this example, lift-assist mechanism 634 is coupled to sidewall 104(4) via a threaded end 642 passed through a support plate 644 and screwed into sidewall 104(4)

Figure 7:
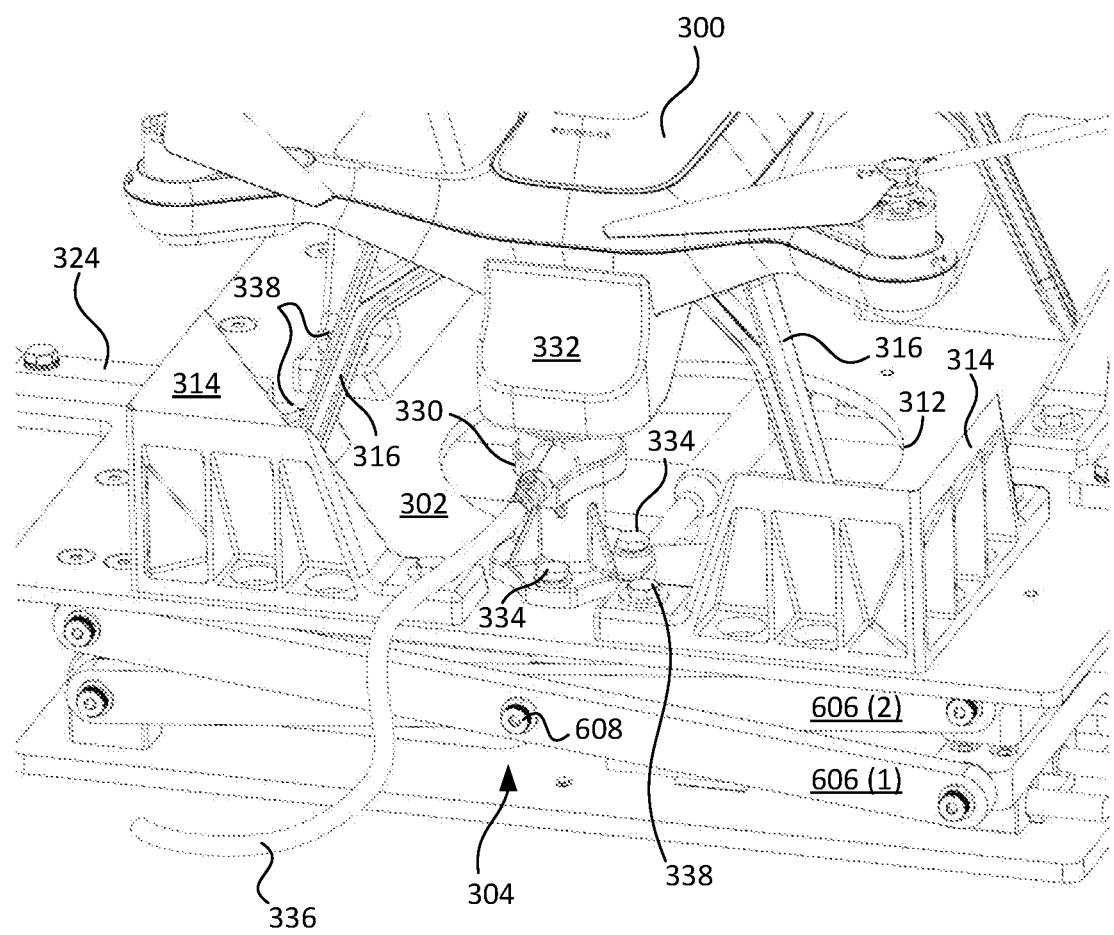
FIG. 7 is a perspective view showing a power connector of the enclosure of FIG. 1 in greater detail.

FIG. 7 is a perspective view showing power connector 330 and complementary power connector 332 in greater detail. Power connector 330 is coupled to platform 302 via a plurality of fasteners 334 (e.g., bolts, screws, rivets, etc.) and extends generally vertically therefrom. A power cable 336 is coupled to power connector 330 and is of sufficient length to allow vertical travel of platform 302 without binding. Power cable 336 is routed from a power source (not shown) to power connector 330 via gap 313 between a sidewall 104 of enclosure 100 and platform 302. (In other figures, power cable 336 is omitted so as not to unnecessarily obscure other features of enclosure 100.)

In the embodiment shown, power connector 330 is fabricated (e.g., 3D printed, etc.) from a nylon in the desired form factor. Additionally, power connector 330 is configured to receive a connector set (e.g., a magnetized, commercial-off-the-shelf terminal set, etc.) therein. Complementary power connector 332, by contrast, is an integral feature of the underbody of UAV 300 that includes a complementary terminal set. To facilitate alignment between the terminals of power connector 330 and complementary power connector 332, power connector 330 can be moved and attached to different locations on platform 302 as desired. Conversely, if power connector 330 is fixed in location, a replacement underbody of UAV 300 can be fabricated (e.g., by 3D printing, etc.) to relocate complementary power connector 332 as desired. In still other embodiments, complementary power connector 332 can be embodied in an adapter affixed to the underbody of UAV 300, for example, by screws. Such an adapter can relocate the stock power connector on UAV 300 to over the location of power connector 330 on platform 302, and further optionally changing the form factor of the stock power connector on UAV 300 to a form factor complementary to power connector 330. Thus, different UAVs can be readily adapted to interface with power connector 330.

FIG. 7 also shows guides 314 in greater detail. In the exemplary embodiment shown, guides 314 are formed from a non-metal (e.g., nylon, etc.) and are ribbed and hollowed for weight savings. Reducing the weight supported by platform 302 is desirable to ensure proper operation of actuator 630. Stated another way, reducing weight of the elements affixed to platform 302 and mechanism 304, enables a heavier UAV 300 and/or smaller actuator 630 to be used. FIG. 7 also shows that each guide 314 is mounted on platform 302 via a plurality of threaded fasteners 338. Accordingly, fasteners 338 can be readily removed and guides 314 swapped for alternative guides. In a particular embodiment, each guide 314 is formed by additive manufacturing, such as 3D printing, whereby the guide features of enclosure 100 can be readily customized to a variety of different UAVs. As shown, guides 314 passively guide the legs 316 of UAV 300 into desired positions on platform 302 adjacent the inner apexes of their respective guides 314 and between their respective guides 314 and aperture 312. Manufacturing guides 314 from a non-magnetic material provides the additional advantage that guides 314 will not interfere with electronic components of UAV 300, for example, if leg(s) 316 of UAV 300 contained sensors vulnerable to magnetic interference, etc.

Figure 8A:
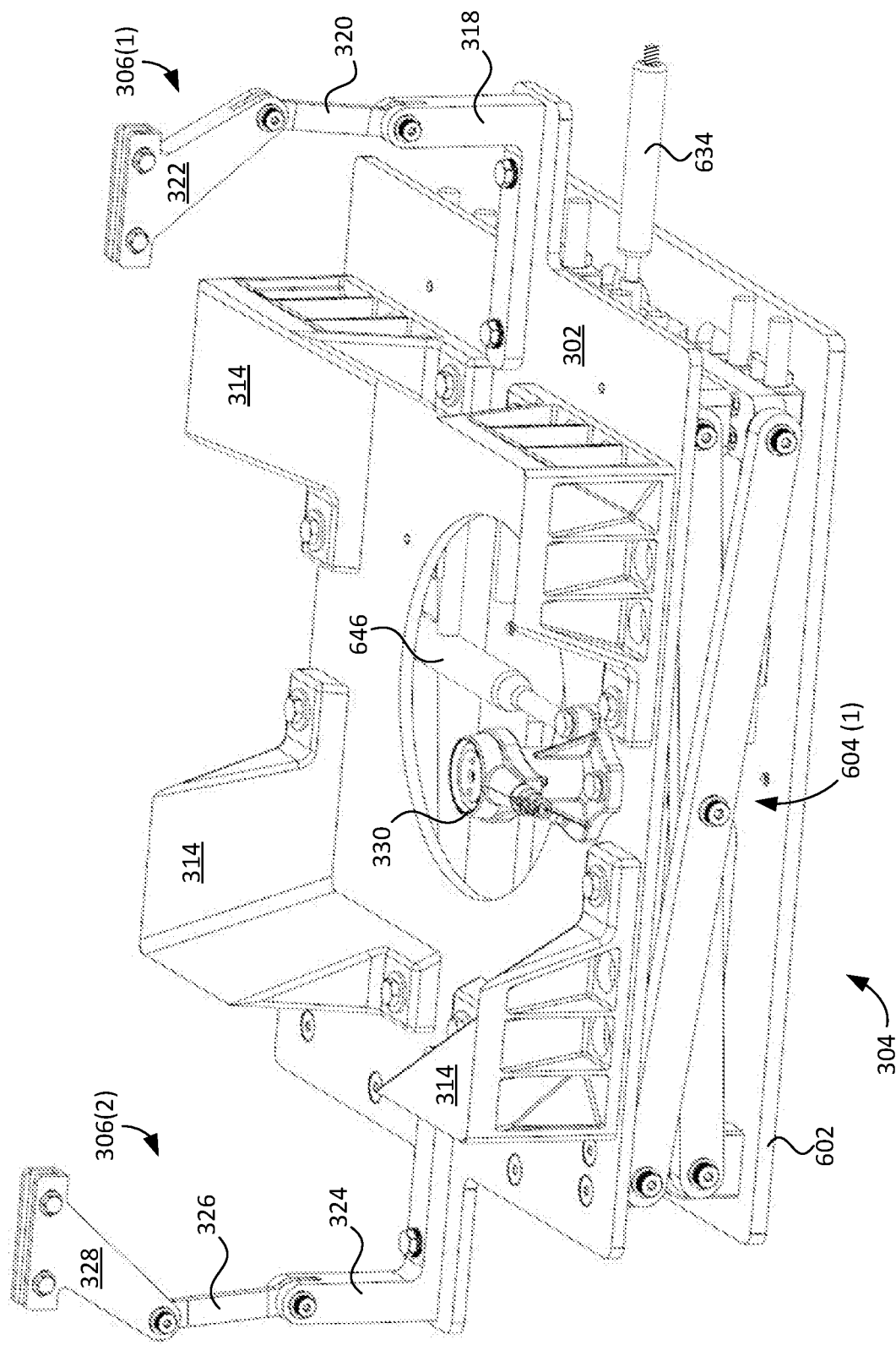
FIG. 8A is a perspective view showing the motive apparatus of the enclosure of FIG. 1 in greater detail.
Figure 8B:
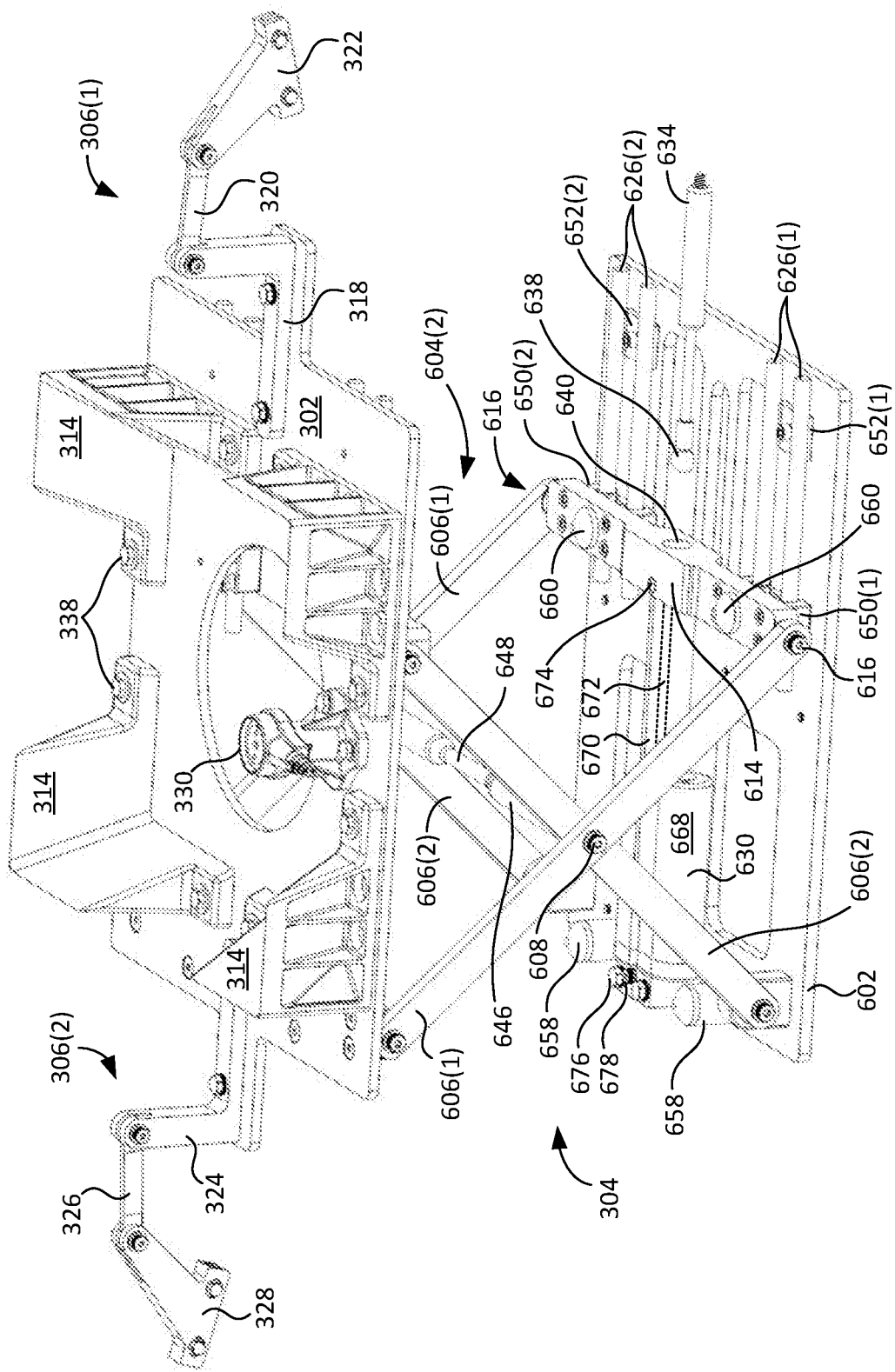
FIG. 8B is another perspective view showing the motive apparatus of the enclosure of FIG. 1 in greater detail.
Figure 8C:
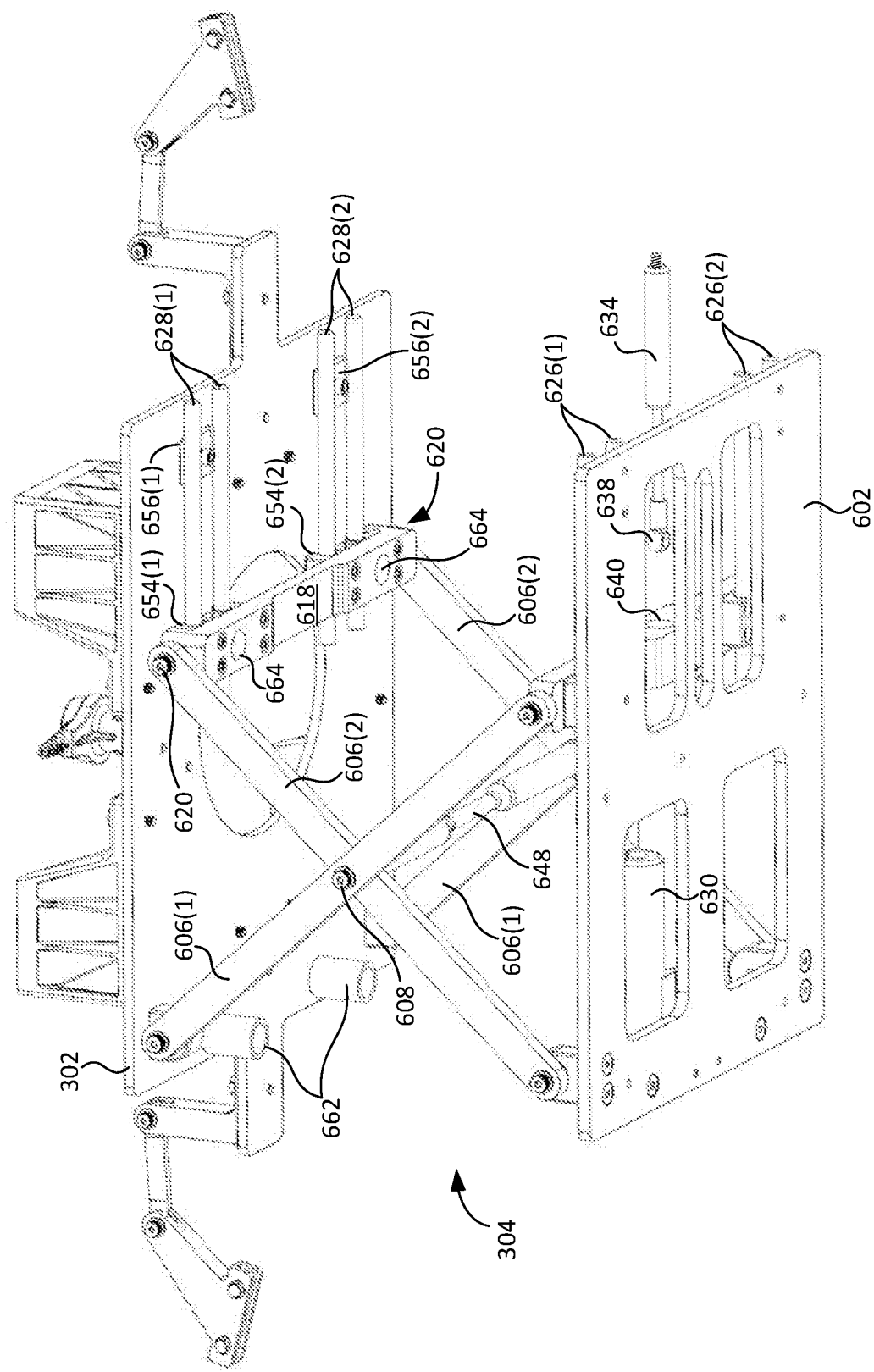
FIG. 8C is a yet another perspective view showing the motive apparatus of the enclosure of FIG. 1 in greater detail.

FIGS. 8A-8C are perspective views of motive apparatus 304 and platform 302 removed from enclosure 100. FIG. 8A shows motive apparatus 304 in a stowed state, whereas FIGS. 8B and 8C show motive apparatus 304 in a deployed state. FIGS. 8A-8C better illustrate several advantageous features of enclosure 100. For instance, FIGS. 8B and 8C show that motive apparatus 304 includes two scissor mechanisms 604(1-2). Additionally, a cross-member 646 is coupled between scissor mechanisms 604(1-2) via center fasteners 608 to provide lateral stability to motive apparatus 304. A center section 648 of cross-member 646 has a smaller diameter such that center section 648 clears actuator 630 in the stowed position.

FIG. 8B further illustrate that lower sliding member 614 is an elongated element that receives fasteners 616 of adjacent scissor mechanisms 604(1-2) at opposite ends thereof. Sliding member 614 further includes carriers 650(1-2) that slidably engage respective sets of lower guide pins 626(1-2). Sets of lower guide pins 626(1-2) are secured to respective mounting brackets 652(1-2) (e.g., via welding, etc.), which themselves are secured to base 602 via threaded fasteners. Mounting brackets 652(1-2) retain guide pins 626(1-2) in position over base 602 such that respective carriers 650(1-2) of lower sliding member 614 can slide thereon. FIG. 8C shows that upper sliding member 618 is similar to lower sliding member 614, except that upper sliding member 618 travels along respective sets of upper guide pins 628(1-2) via carriers 654(1-2). Sets of upper guide pins 628(1-2) are positioned and supported under platform 302 via respective mounting brackets 656(1-2).

FIGS. 8B and 8C also illustrate that motive apparatus 304 includes a plurality of fixed bumpers 658 and a plurality of sliding bumpers 660 (FIG. 8B). Bumpers 658 extend upward from base 602, whereas sliding bumpers 660 are coupled to the upper surface of lower sliding member 614. Bumpers 658 and 660 are configured to engage a plurality of fixed receivers 662 and a plurality of sliding receivers 664, respectively, located below platform 302 (FIG. 8C). Fixed receivers 662 are cylindrical receptacles affixed (e.g., welded, glued, brazed, etc.) to the underside of platform 302 and extend downward therefrom, whereas sliding receivers 664 are coupled to the lower surface of upper sliding member 618. Bumpers 658 and 660 have compliant (e.g., rubber, etc.) top surfaces that cushion the interface with complementary ones of receivers 662 and 664 when platform 302 is in the stowed position. Sliding bumpers 660 and sliding receivers 664 slide into engagement as platform reaches its stowed position.

Bumpers 658 and 660 and receivers 662 and 664 arrest downward motion of platform 302 above actuator 630 and further prevent lateral movement of platform 302 in the stowed position. Furthermore, this bumper and receiver combination, together with retainers 310 (FIG. 3) on lids 106(1-2), further secure platform 302 and UAV 300 therebetween when lids 106(1-2) are closed. These features advantageously reduce vibration on platform 302 and UAV 300 during travel and further prevents UAV 300 from shifting on platform 302, for example, when a vehicle having enclosure 100 mounted thereon is moving over rough terrain. Even without UAV 300, bumpers 658 and 660 and receivers 662 and 664 reduce vibration on platform 302 and prevent hard contact between components of motive apparatus 304.

FIG. 8B further illustrates that actuator 630 includes a drive element 668 and an extension element 670. Extension element 670 includes a ram 672 that extends and retracts axially therefrom under the control of drive element 668. Ram 672 is attached within bore 640 opposite ball end 638 via a pin 674 passing transversely to ram 672 through the top of sliding member 614. Pin 674 can be removable for rapid removal and servicing of actuator 630. Actuator 630 is also secured to base 602 via fasteners 676 and receives power and control signals via connector set 678. In a particular example, actuator 630 outputs data (e.g., a potentiometer value, etc.) indicative of the extension of ram 672 via connector set 678. As ram 672 extends, motive apparatus 304 and linkages 306(1-4) provide means that transform the ram's horizontal movement into combined, amplified vertical movement of platform 302 and indirect movement of the lids 106(1-2).

Figure 9A:
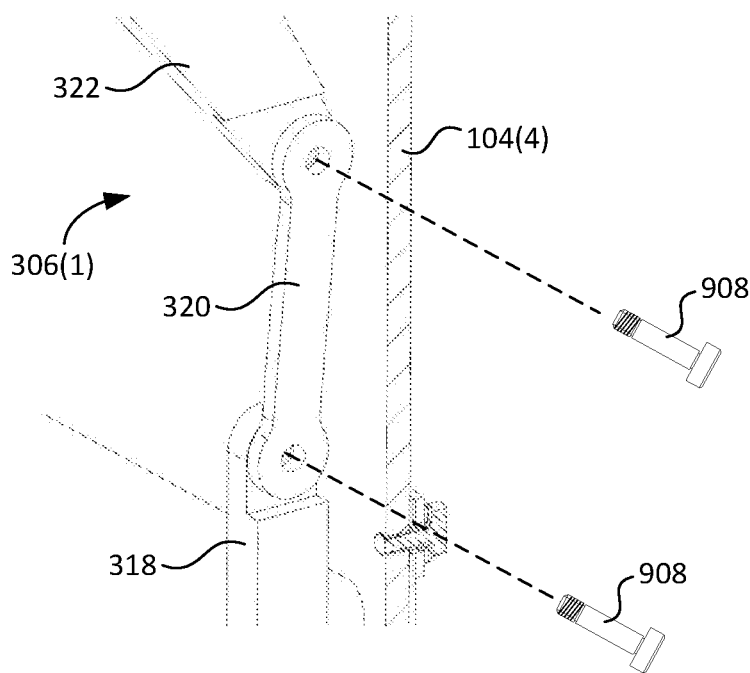
FIG. 9A is a partially cut-away, perspective view showing one of the lid linkages of the enclosure of FIG. 1 in greater detail.
Figure 9B:
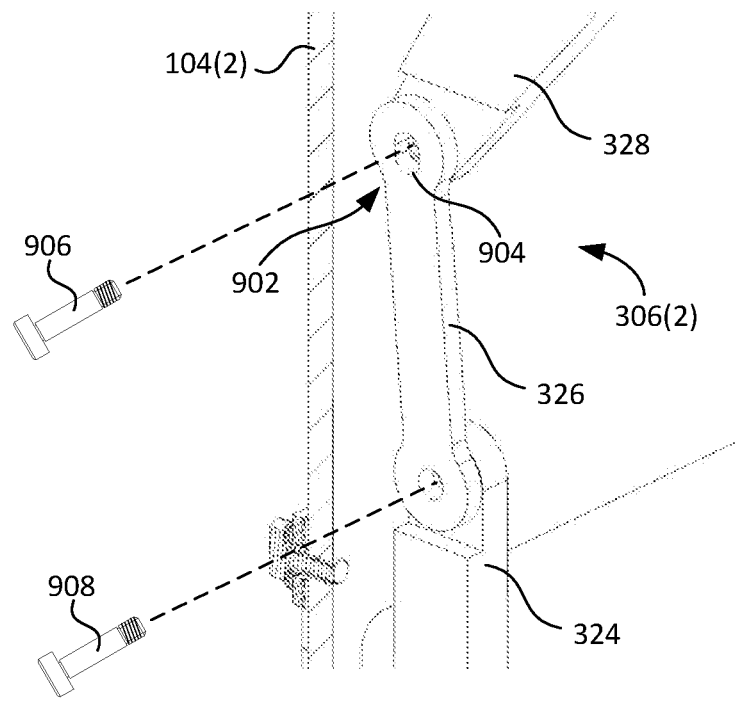
FIG. 9B is a partially cut-away, perspective view showing another one of the lid linkages of the enclosure of FIG. 1 in greater detail.

FIG. 9A is a partially cut-away, perspective view showing linkage 306(1) in greater detail. Similarly, FIG. 9B is a partially cut-away, perspective view showing linkage 306(2) in greater detail. Linkages 306(1) and 306(2) control the movement of first and second lids 106(1) and 106(2) (FIG. 3) based on the vertical position of platform 302. Linkages 306(1) and 306(2) are shown in FIGS. 9A and 9B as they would be oriented with platform 302 lowered.

As explained above, each of linkages 306(1-2) is a three-segment linkage, wherein the first segments 318 and 324, as well as the third segments 322 and 328, of respective linkages 306(1-2) are generally mirror images of each other (see also FIG. 3). Middle segments 320 and 326, however, are slightly different. As shown, middle segment 326 of linkage 306(2) comprises a mechanical adjustment feature 902 at one of its connection points that is configured to adjust the movement of second lid 106(2) relative first lid 106(1) so as to prevent lid binding on opening and closing. While linkage 306(2) includes adjustment feature 902 in this embodiment, in other embodiments linkage 306(1) could include an adjustment feature 902, each linkage 306 could include one or more adjustment feature(s), etc.

In this embodiment, mechanical adjustment feature 902 comprises an elongated aperture 904 formed in middle segment 326 at its connection point with third segment 328. Elongated aperture 904 is configured to slide and pivot over a fastener 906 passing therethrough, which in this embodiment, comprises a shoulder bolt that also threadably engages segment 328. The other fasteners 908 shown also comprise shoulder bolts, which permit the segments of each linkage 306(1-2) to pivot relative to one another.

When platform 302 is in its lowermost stowed position, fastener 906 is positioned near the upper end of aperture 904. Thus, when platform 302 begins to move vertically, aperture 904 initially slides over fastener 906 before the bottom of aperture 904 engages fastener 906 and begins pushing lid 306(2) open. In contrast, neither of the apertures of middle segment 320 of lid 306(1) are elongated. Thus, the motion of lid 306(2) is delayed slightly relative to lid 306(1) on opening. This delay advantageously prevents the inside long edges of lids 106(1-2) (e.g., those under weather stripping 112) from binding.

Adjustment feature 902 provides similar advantages when lids 106(1-2) are closing, because lid 306(2) will close slightly prior to lid 306(1). In particular, as member 328 approaches an over-center position relative to member 326, fastener 906 (and thus member 328 and lid 306(2) connected thereto) will fall downward within elongated aperture 904 until it is resting on the bottom of elongated aperture 904. Thus, lid 306(2) will close slightly before lid 306(1) due to member 328 being in a slightly lower position as compared to member 322 of linkage 306(1). Once platform 302 is in its lowermost position, fastener 906 will again be positioned near the top of elongated aperture 904 so as to provide delay functionality on the next opening of lids 106(1-2). The action of adjustment feature 902 on lid closing prevents lids 106(1-2) from binding and ensures that weather stripping 112 is correctly positioned over the gap between lids 106 (1-2) when the lids are closed.

Figure 10:
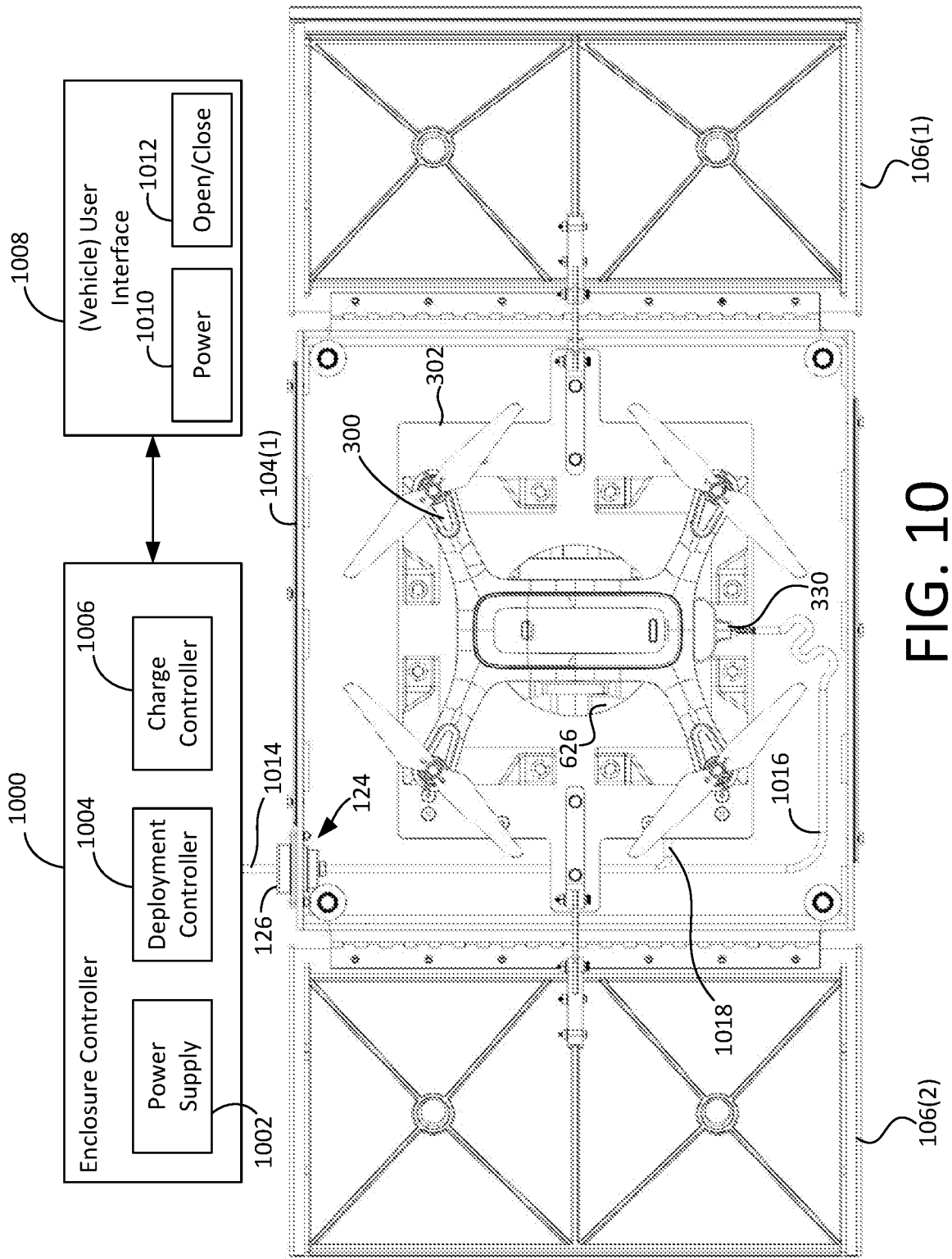
FIG. 10 is a top plan diagrammatic view showing the enclosure of FIG. 1 electrically coupled with an enclosure controller.

FIG. 10 is a top plan diagrammatic view showing enclosure 100 electrically coupled with an enclosure controller 1000. Enclosure controller 1000 includes a power supply 1002, a deployment controller 1004, and a charge controller 1006. Additionally, enclosure controller 1000 is in communication with (or alternatively itself includes) a user interface 1008. In this example, user interface 1008 comprises a manual switch array having a power switch 1010 and an Open/Close switch 1012, although alternative embodiments are possible. One or more bus(es) 1014 electrically couple enclosure controller 1000 and the elements of enclosure 100.

Enclosure controller 1000 provides overall operational coordination and control of enclosure 100. Power supply 1002 provides power to enclosure controller 1000 and the elements of enclosure 100, including actuator 630 and power connector 330. Deployment controller 1004 provides control signals (e.g., extend, retract, stop, etc.) to actuator 630 that cause actuator 630 to selectively raise and lower platform 302, thereby selectively opening or closing lids 106(1-2). In a particular embodiment, actuator 630 comprises a potentiometer that provides a variable resistance feedback to deployment controller 1004, whereby deployment controller 1004 knows the deployment state of actuator 630 and the associated positions of platform 302 and lids 106(1-2). Such feedback also enables deployment controller 1004 to halt operation of actuator 630 should controller 1004 determine that motive apparatus 304 is stuck/bound in position. Charge controller 1006 is operative to selectively cause power supply 1002 to supply charge power to power connector 330 responsive to determining a completed circuit exists with UAV 300, according to a predefined charge program, based on the position of actuator extension, etc.

Bus(es) 1014 traverse passage 124 in sidewall 104(1) via passage insert 126. Bus(es) 1014 comprise a plurality of buses in this embodiment, including a power bus 1016 and an actuator bus 1018. Power bus 1016 is configured to supply electrical power to power connector 330. Actuator bus 1018 is configured to provide power and position feedback (e.g., voltages of particular polarity, position signals, etc.) to actuator 630.

User interface 1008 facilitates operator control of enclosure 100. Power switch 1010 enables a user to selectively turn enclosure controller 1000 (and thus enclosure 100) on and off. Open and close switch 1012 enables an operator (e.g., a maintenance technician, etc.) to selectively open and close enclosure 100, for example, to perform maintenance on enclosure 100, switch out UAVs 300, etc. User interface 1008 can be mounted on a ground vehicle remote to enclosure controller 1000, on enclosure itself, within a vehicle, etc.

Figure 11:
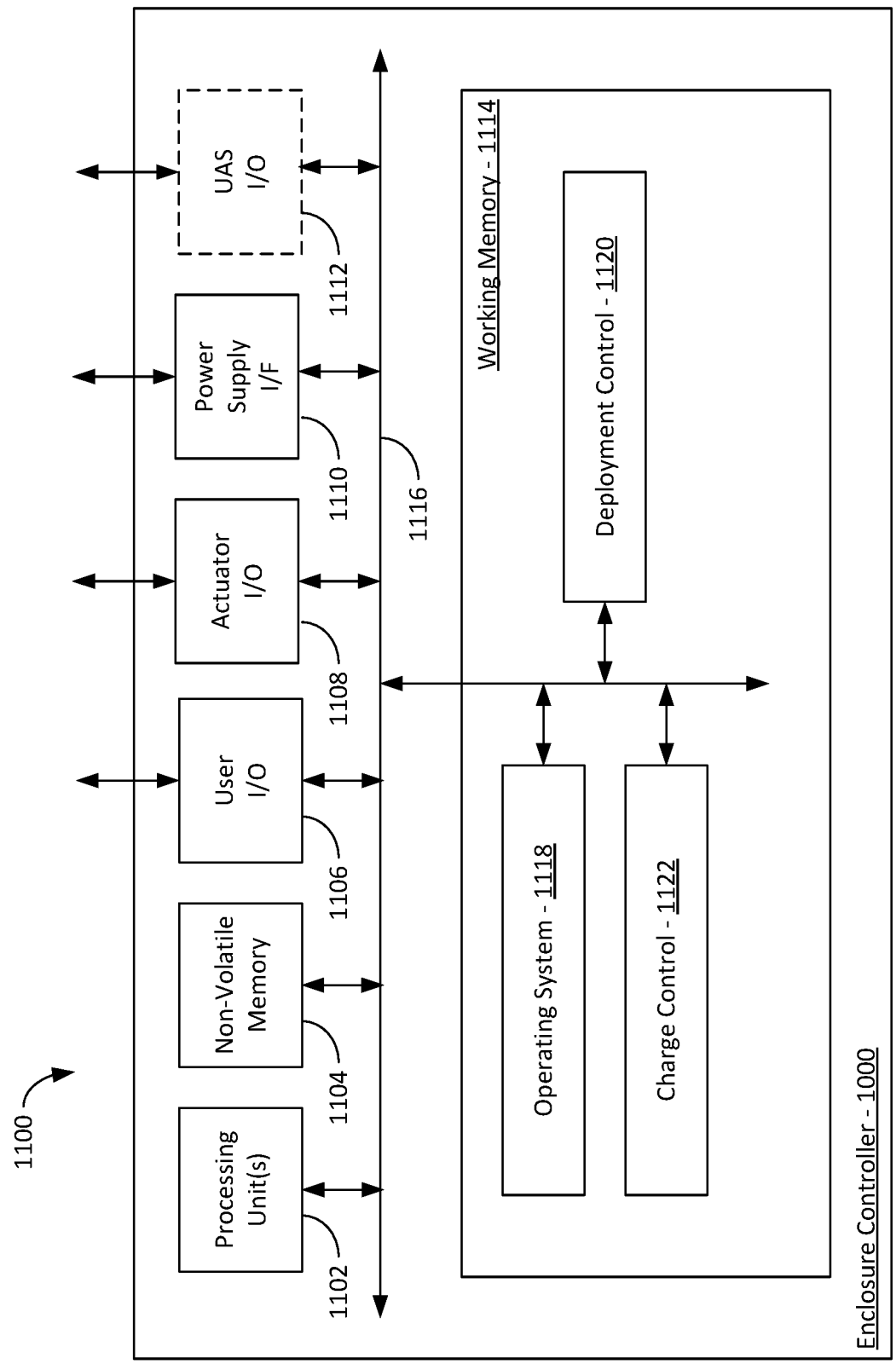
FIG. 11 is a block diagram of an exemplary computer system embodying the enclosure controller of FIG. 10.

FIG. 11 is a block diagram showing enclosure controller 1000 embodied in a computer system 1100, according to a particular embodiment of the present invention. Computer system 1100 includes one or more processing unit(s) 1102, non-volatile memory 1104, one or more user I/O interface 1106, at least one actuator interface 1108, at least one power supply interface 1110, a UAS interface 1112, and a working memory 1114 all intercommunicating via a system bus 1116.

The components of computer system 1100 provide the following functions. Processing unit(s) 1102 process data and code contained in working memory 1114 to cause enclosure controller 1000 to carry out its intended functions. Non-volatile memory 1104 (e.g., solid-state memory, harddisk drive, etc.) provides storage for data and code (e.g., boot code, operating system, deployment control algorithms, charge control algorithms, etc.) that are retained even when computer system 1100 is powered down. User I/O interface 1106 provides communication between computer system 1100 and vehicle user interface 1008 (FIG. 10) and/or between computer system 1100 and other operator interfaces (e.g., display devices, keyboards, mouse, etc.). Actuator interface 1108 facilitates communication between computer system 1100 and actuator 630 of enclosure 100, such that computer system 1100 can control actuator 630 to selectively deploy or stow UAV 300. Additionally, actuator interface 1108 facilitates communication of position and/or other feedback signals (e.g., potentiometer values, etc.) from actuator 630 to computer system 1100. Power supply interface 1110 enables computer system 1100 to control power supply 1002. UAS interface 1112 can be implemented to enable computer system 1100 to communicate with UAV 300, for example, to turn UAV 300 on or off, to obtain drone battery information, etc. System bus 1116 facilitates intercommunication between the various components/modules of computer system 1100.

Working memory 1114 (e.g., random access memory) provides dynamic memory for computer system 1100 and includes executable code that is loaded therein during initialization, for example, from non-volatile memory 1104. Working memory 1114 has loaded therein an operating system 1118, a deployment control module 1120, and a charge control module 1122. Operating system 1118 provides overall coordination and control of the functions provided by computer system 1100. Deployment control module 1120 and charge control module 1122 provide the functions discussed above for deployment and charge controllers 1004 and 1006, respectively.

Figure 12A:
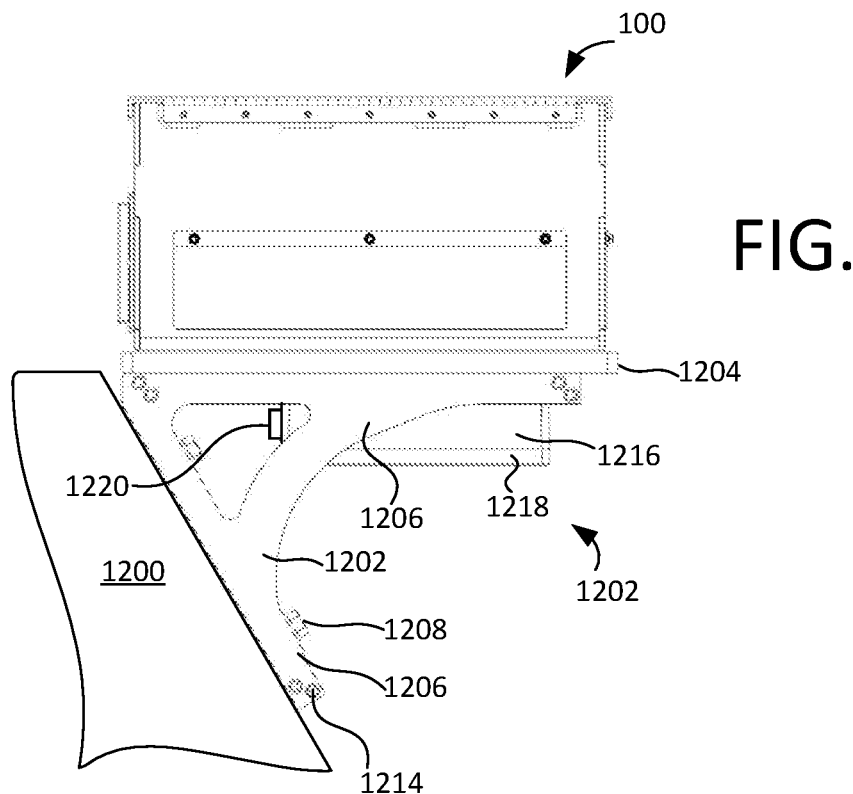
FIG. 12A is a perspective view showing the enclosure of FIG. 1 mounted on a vehicle bracket according to an exemplary embodiment of the present invention.
Figure 12B:
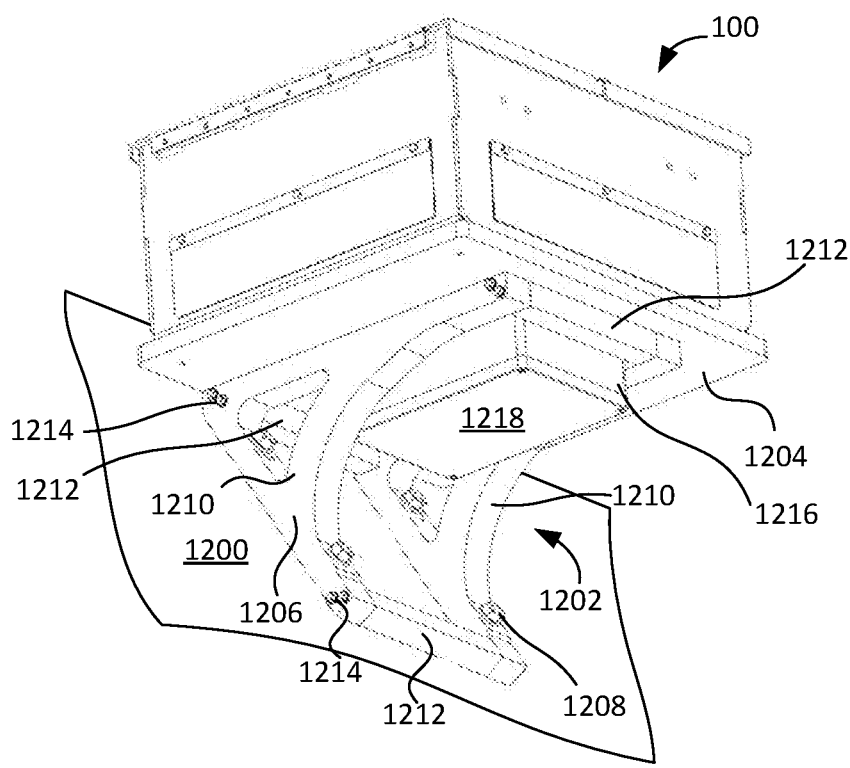
FIG. 12B is another perspective view showing the enclosure of FIG. 1 mounted on the vehicle bracket of FIG. 12A.

FIG. 12A and FIG. 12B are side and perspective views, respectively, showing enclosure 100 mounted on an external surface of a ground vehicle 1200 via a vehicle bracket 1202. In the embodiment shown, ground vehicle 1200 is a military ground vehicle.

Vehicle bracket 1202 includes a base 1204 and a mounting portion 1206 secured to the underside of base 1204 (e.g., via welding, fasteners, etc.). Base 1204 is generally flat (e.g., a metal plate, etc.) and supports enclosure 100 thereon. Mounting portion 1206 mounts vehicle bracket 1202 to vehicle 1200 via a plurality of fasteners 1208. Enclosure 100 can be affixed to a top surface of base 1204 via its attachment assemblies 128 (FIG. 6A).

Mounting portion 1206 comprises an assembly of structural members, including a plurality of arcuate supports 1210 and a plurality of cross-members 1212. Cross-members 1212 space arcuate supports 1210 in a parallel relationship and are secured together by pluralities of fasteners 1214. Arcuate supports 1210 are configured to mount enclosure 100 to an inclined side of vehicle 1200 (e.g., on a turret, etc.) in a level state. The curved nature of supports 1210 also minimize risks of interference of bracket 1202 with other vehicle components if bracket 1202 is in motion (e.g., when positioned on a turret, etc.). The angle provided by arcuate supports 1210, however, to facilitate mounting enclosure 100 on ground vehicle 1200 at any desired angle.

Vehicle bracket 1202 further includes an electronics enclosure 1216 secured (e.g., welded, by fasteners, etc.) to the underside of base 1204 within the perimeter of mounting portion 1206. Enclosure 1216 includes a removable lid 1218 and one or more wiring connector(s) 1220. Enclosure 1216 houses and protects computer system 1100 embodying enclosure controller 1000 therein and enables computer system 1100 to electrically connect with enclosure 100 and vehicle 1200 via connector(s) 1220. Removable lid 1218 provides access to computer system 1100 for programming, upgrades, etc. Optionally, vehicle user interface 1008 can also be incorporated into electronics enclosure 1216 so it is readily accessible outside vehicle 1200. In other embodiment, enclosure controller 1000 can be incorporated inside enclosure 100, inside vehicle 1200, etc. However, the exemplary embodiment of vehicle bracket 1202 shown efficiently houses control electronics for enclosure 100 outside of enclosure 100 in a compact arrangement that also provides for convenient cable routing. Accordingly, the size and footprint of enclosure 100 are minimized.

While enclosure 100 is shown mounted to the side of ground vehicle 1200 in this embodiment, it should be understood that enclosure 100 can be used for UAS storage apart from any vehicle. Enclosure 100 can, for example, be stationed on the ground or on a support structure in any desired location. Indeed, in some cases enclosure 100 might be installed or mounted on a building, a sea-faring vessel, or at or on any other location or item where UAS storage is desirable.

The disclosure describes a self-contained UAS enclosure 100 that comprises various advantageous features. For example, UAS enclosure 100 transitions between stowed and deployed states by movement of a platform 302. Raising platform 302 to deploy the UAS opens the lids 106 and positions the UAS for takeoff. Conversely, lowering platform 302 stows the UAS in the enclosure and closes lids 106. While multiple actuators can be used to provide these movements, enclosure 100 advantageously accomplishes movement of platform 302 and lids 106 via a single actuator. Furthermore, the present disclosure describes drone positioning aids, in particular guides 314, which passively position the UAS for stowage during landing. Enclosure 100 also includes vibration and jittering reduction mechanism(s) (e.g., retainers 310, bumpers 658, 660 and receivers 662, 664, etc.), which automatically secure platform 302 and the UAS 300 thereon as enclosure 100 is closing. As another example, enclosure 100 includes various air management features that route rotor wash away from the UAS, which improves UAS control during take-off and landing. These and other advantages of enclosure 100 will be apparent in view of this disclosure.

Indeed, UAS enclosure 100 facilitates the ready and secure transport of UAS on vehicles, particularly military ground vehicles, for on-demand aerial surveillance and improvement of vehicle safety, for example, from non-line-of-sight attacks. Additionally, enclosure 100 is robust, protects the UAS in military environments, and has a small footprint facilitating easy mounting.

While exemplary embodiments are described above, it is not intended that these embodiments describe all possible forms of the invention. Rather, the words used in the specification are words of description rather than limitation, and it is understood that various changes may be made without departing from the spirit and scope of the invention. For example, additional or fewer than four platform guides may be employed depending on the UAS or platform configuration. As another example, an enclosure might have more than two lids or have define interior volumes of different shapes. As still another example, enclosure might be expanded to house a plurality of drones. These and other modifications are possible in view of this disclosure. Additionally, the features of various implementing embodiments may be combined or eliminated to define further embodiments of the invention.

What is claimed is:

1. An enclosure for an unmanned aerial system (UAS), said enclosure comprising:
   a housing defining an interior volume;
   an actuator mounted within said interior volume;
   a platform coupled to said actuator and configured to move generally vertically within said interior volume under control of said actuator, said platform defining an opening therethrough and a generally uniform gap around a perimeter of said platform between said platform and said housing, said opening and said gap facilitating the passage of air by said platform;
   first and second non-metallic lids movable between open and closed positions under control of said actuator, each of said first and said second lids being pivotably coupled between said housing and said platform via a multi-segment linkage;
   a plurality of airflow management vents formed in said housing;
   a plurality of guides coupled to said platform and being configured to slidably engage respective landing supports of said UAS and to guide each of said landing supports along a plurality of directions into a predetermined position on said platform between an inside apex of said guide and said opening;
   a plurality of retainers mounted on an inside surface of each of said first and said second lids, each of said retainers being positioned to urge said UAS toward said platform when said lid is in said closed position;
   a power connector coupled to said platform and configured to engage a complementary power connector on said UAS; and wherein
   driving said actuator in a first direction raises said platform and opens said first and said second lids;
   driving said actuator in a second direction opposite said first direction lowers said platform and closes said first and said second lids;
   each of said multi-segment linkages comprises a first segment affixed to said platform and extending generally upward therefrom to define a first connection point, a second segment affixed to a respective one of said first and said second lids and extending away from said respective lid to define a second connection point, and a third segment pivotably coupled between said first connection point and said second connection point; and
   said multi-segment linkage of said first lid further comprises a mechanical feature formed in at least one of said first connection point and said second connection point such that said first lid opens slower than said second lid.

2. The enclosure of claim 1, wherein
said housing includes a base and a plurality of sidewalls coupled to said base, said base and said plurality of sidewalls defining said interior volume.

3. The enclosure of claim 1, wherein said power connector protrudes generally upward from said platform.

4. The enclosure of claim 3, wherein said plurality of guides extend generally vertically from said platform and are configured to passively position said UAS such that said complementary power connector of said UAS is moved into alignment with said power connector coupled to platform.

5. The enclosure of claim 1, wherein each of said plurality of guides extends generally vertically from said platform and is configured to passively guide said landing support of said UAS.

6. The enclosure of claim 5, wherein
at least some of said plurality of guides are removably coupled to a top surface of said platform outside of said opening.

7. The enclosure of claim 1, wherein
each of said plurality of retainers is positioned to contact a respective one of a plurality of propellers of said UAS.

8. The enclosure of claim 1, further comprising at least one bumper coupled to said actuator, said at least one bumper positioned under said platform.

9. The enclosure of claim 8, wherein said at least one bumper moves via said actuator.

10. The enclosure of claim 1, further comprising a biasing member configured to bias said platform toward a raised position when said platform is in a lowered position.

11. The enclosure of claim 1, further comprising an enclosure controller adapted to interface with said actuator and to selectively drive said actuator in said first and said second directions.

12. The enclosure of claim 11, further comprising:
a vehicle bracket comprising a base; and wherein
said enclosure is mounted to a first side of said base; and
said enclosure controller is mounted to a second side of said base opposite said enclosure.

* * * * *